(12) United States Patent
Meier et al.

(10) Patent No.: US 7,086,672 B2
(45) Date of Patent: Aug. 8, 2006

(54) REACTOR CLAMP

(75) Inventors: Daniel J. Meier, Indianapolis, IN (US); James R. Wasson, Los Altos, CA (US)

(73) Assignee: Biotage AB (SE)

( * ) Notice: Subject to any disclaimer, the term of this patent is extended or adjusted under 35 U.S.C. 154(b) by 0 days.

(21) Appl. No.: 10/372,380

(22) Filed: Feb. 21, 2003

(65) Prior Publication Data
US 2004/0135379 A1    Jul. 15, 2004

Related U.S. Application Data

(63) Continuation of application No. 10/339,229, filed on Jan. 9, 2003.

(51) Int. Cl.
  *B65D 45/32*    (2006.01)
(52) U.S. Cl. .............................. 292/256.65; 220/366.1
(58) Field of Classification Search ............ 292/256.5, 292/256.63, 256.65, 256.67, 256.73; 220/316, 220/366.1, 367.1, 582
See application file for complete search history.

(56) References Cited

U.S. PATENT DOCUMENTS

| | | | |
|---|---|---|---|
| 1,482,049 A * | 1/1924 | Swanson | |
| 1,826,947 A * | 10/1931 | Nelson | |
| 1,901,699 A * | 3/1933 | Burpee | |
| 2,283,304 A * | 5/1942 | Williams | 292/212 |
| 2,288,312 A * | 6/1942 | Brown | 220/55 |
| 2,452,612 A * | 11/1948 | Swenberg | 277/61 |
| 2,982,437 A | 5/1961 | Wheatley | |
| 3,043,465 A * | 7/1962 | Horner | 220/565 |
| RE26,127 E | 12/1966 | Wade | |
| 3,802,464 A * | 4/1974 | Frank et al. | 138/30 |
| 4,109,819 A * | 8/1978 | Kushman | 220/208 |
| 4,219,125 A | 8/1980 | Wiltshire et al. | |
| 4,288,116 A | 9/1981 | Schlienger | |
| 4,294,377 A | 10/1981 | Chen | |
| 5,121,852 A | 6/1992 | Wilkes | |
| 5,193,864 A * | 3/1993 | Coleman | 292/256.67 |
| 5,297,444 A | 3/1994 | Kriner et al. | |
| 5,411,162 A | 5/1995 | Koziczkowski et al. | |

(Continued)

FOREIGN PATENT DOCUMENTS

DE        3339109    *    5/1985

(Continued)

OTHER PUBLICATIONS

Hazard Evaluation Laboratory, Inc. "Reaction Calorimetry Simular." [no date listed].

*Primary Examiner*—Gary Estremsky
(74) *Attorney, Agent, or Firm*—Doreen Gridley; Michael A. Swift; Ice Miller LLP

(57) ABSTRACT

A modular reactor system comprises a backplane connected to a computer and a thermal control unit. The backplane includes a plurality of seats for releasably holding a plurality of modules. Each module holds a reactor vessel that may be used to conduct experiments. A plurality of laboratory instruments, such as motors, switches, sensors and pumps are included within the backplane and on the reactor modules. These laboratory instruments are utilized to perform work on the contents of the reactor vessels when the modules holding the reactor vessels are positioned in the backplane. A computer is connected to the backplane and controls the laboratory instruments within the backplane and on the reactor modules positioned within the backplane. A thermal control unit provides a thermal control fluid that is delivered to the reactors in the reactor modules when the modules are properly seated in the backplane.

6 Claims, 17 Drawing Sheets

U.S. PATENT DOCUMENTS

| | | | | |
|---|---|---|---|---|
| 5,415,198 | A | * 5/1995 | Ewert | 137/588 |
| 5,522,625 | A | * 6/1996 | Flick et al. | 285/409 |
| 5,657,892 | A | 8/1997 | Bolli et al. | |
| 5,713,482 | A | 2/1998 | Bordner et al. | |
| 5,906,289 | A | 5/1999 | Aliesch et al. | |
| 5,908,210 | A | * 6/1999 | Fetzer | 285/24 |
| 6,073,979 | A | * 6/2000 | Nawalaniec et al. | 292/256 |
| 6,401,958 | B1 | 6/2002 | Foss et al. | |
| 6,568,554 | B1 | * 5/2003 | Booth | 220/316 |

FOREIGN PATENT DOCUMENTS

| | | |
|---|---|---|
| EP | 0491324 B1 | 3/1994 |
| EP | WO 95/26911 | * 10/1995 |

* cited by examiner

FIG. 14

| # | Mode | Hold | TSP | Trate | AddMode | UpperdT | LowerdT | Feed 1 | Rate | Product 1 | Feed 2 | Rate | Product 2 | Gas | Vacuum | Vent | Aux DO | Stir SP | LogF |
|---|------|------|-----|-------|---------|---------|---------|--------|------|-----------|--------|------|-----------|-----|--------|------|--------|---------|------|
| 1 | Tr | 0 | 25 | 0 | Off | 0 | 0 | 0 | 0 | Aqueous | 0 | 0 | Aqueous | Open | Close | Close | Off | 400 | |
| 2 | Tr | 0 | 25 | 0 | Time | 0 | 0 | 20 | 4 | Aqueous | 0 | 0 | Aqueous | Open | Close | Close | Off | 400 | |
| 3 | Tr | 0 | 50 | 0 | Off | 2 | 2 | 0 | 0 | Aqueous | 0 | 0 | Aqueous | Open | Close | Close | Off | 400 | |
| 4 | Tr | 0 | 50 | 0 | Time | 2 | 2 | 0 | 0 | Aqueous | 10 | 2 | Light Organic | Open | Close | Close | Off | 400 | |
| 5 | Tr | 0 | 25 | 0 | Off | 0 | 0 | 0 | 0 | Aqueous | 0 | 0 | Aqueous | Open | Close | Close | Off | 400 | |

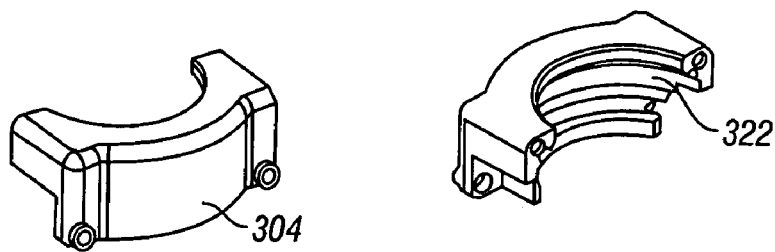
FIG. 18
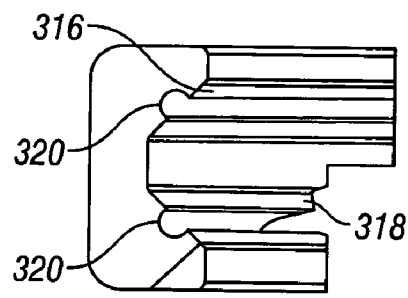
FIG. 19
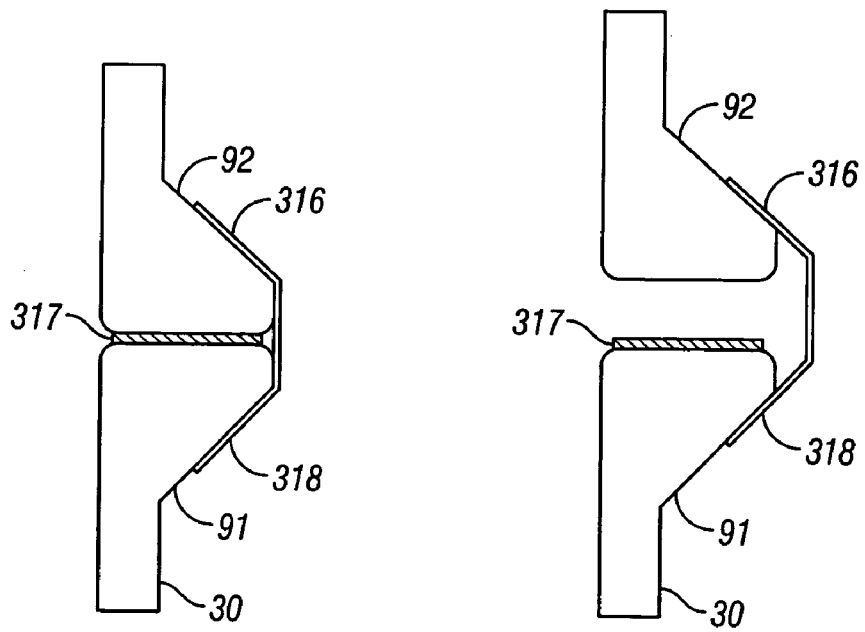
FIG. 20     FIG. 21

REACTOR CLAMP

CROSS-REFERENCE TO RELATED APPLICATIONS

This application is a continuation of U.S. application Ser. No. 10/339,229 filed Jan. 9, 2003.

BACKGROUND

The present invention is related to the field of chemical reactors, and more particularly, automated reactors for use in process research and development as may be conducted in a laboratory.

Laboratory automation developed over the past decade has allowed chemists to become much more efficient in conducting experiments. Laboratory automation has been particularly useful for high thru-put screening, where a large number of different compounds are tested using particular chemicals. These tests are typically conducted in very small reaction vessels, such as multiple well microplates (e.g., 96 well microplates), where a very small amount of reagent is added to a small amount of experimental solution in each microplate well. From the large number of small scale experiments, a few promising leads may be identified. These leads will require additional testing on a larger scale, before truly promising chemical combinations can be identified. Larger scale testing typically involves larger amounts of experimental solution combined with larger amounts of reagents. Of course, these tests are conducted in larger reaction vessels, such as vessels of 50 ml or more.

A few systems exist that allow chemists to automate experiments in larger reaction vessels. Examples of such systems include the CLARK® automatic reactor system sold by Argonaut Technologies, Inc. of Foster City, Calif. Such systems typically provide a single reactor vessel and a number of laboratory instruments capable of automatically interacting with the reactor vessel. When using these systems, a chemist first prepares a reactor and attaches all necessary components for completion of the experiment (e.g., reagent feed lines, temperature sensors, stirrers, etc.). After the reactor is prepared, the chemist uses a software program to provide instructions for conducting the experiment using the laboratory instruments. After receiving the chemist's instructions, the software controls the laboratory instruments to automatically conduct the experiment (e.g., the system automatically feeds reagents at the desired times, monitors reaction variables, stirs the experimental solution, etc.). This automation allows the experiment to be conducted without the chemist being physically present, thus freeing the chemist to complete other valuable tasks.

Although laboratory automation continues to assist with high thru-put screening, many areas for improvement remain. For example, many automated laboratory systems for larger scale reactions are limited to use in a single experiment. Chemists would like to simultaneously conduct several different larger scale experiments using a single software program. Furthermore, those automated laboratory systems that allow chemists to conduct more than one experiment are limited to conducting very similar experiments with similar functions, environmental conditions, and steps in any given batch of experiments. Chemists would like to have the flexibility to simultaneously conduct very different experiments using a single automated laboratory system. Of course, many other areas for improvement remain. The modular reactor system of the present invention presents a number of improvements over such prior art systems.

SUMMARY

A modular reactor system includes an apparatus that houses several small reactors and independently measures and controls the critical parameters of each reactor during experiments, thereby allowing chemists to study the synthesis of a broad range of compounds. The apparatus comprises a computer, a housing having a plurality of seats, and a thermal control unit. A plurality of modules are removably positioned in the seats of the housing. Each of the plurality of modules includes a module shell that holds a jacketed reactor vessel. The reactor vessel includes a reactor chamber and a plurality of ports leading to the reactor chamber and designed to receive laboratory instruments. Each reactor vessel also includes a fluid chamber formed between an exterior wall and an interior wall. The exterior wall includes an inlet port for receiving thermal control fluid into the fluid chamber and an outlet port for expelling thermal control fluid from the thermal control chamber for return to the thermal control unit.

The housing of the modular reactor system comprises a trunk that supports the plurality of seats and a top canopy. A plurality of laboratory instruments are positioned within the housing. For example, a plurality of electric motors are connected to stirrers that extend into reactor vessels seated in the housing. In addition, a plurality of gas lines are positioned in the housing along with a plurality of gas line connectors. Each gas line connector joins one of the gas lines to one of the modules when the module is positioned in one of the seats of the housing. Furthermore, a plurality of electrical connectors are associated with each seat of the housing. Placement of one of the modules in a seat of the housing joins the electrical connector to the module. The electrical connector provides an electrical connection between the module and the computer.

Each module of the module reactor system further comprises at least one clamp that retains the reactor in the reactor seat. In addition, each module includes at least one pump positioned on the module shell. At least one reagent seat is also positioned on the module shell. The at least one pump is operable to pump a reagent positioned on the reagent seat to the reactor chamber.

Each module may also include a unique identification. The unique identification may be as simple as a name or tag assigned to the module and marked somewhere on the module so that the unique identification may be read by a human. However, in one embodiment of the invention, the unique identification is an electronic tag or similar identifier. In this embodiment, an identification reader is associated with each of the seats. Each identification reader is operable to read the identification of one of the modules placed in the seat associated with the identification reader. The unique identification of each module is passed on to the computer which is programmed to execute unique instructions with respect to each module, regardless of the seat in which the module is placed.

These and other features, aspects, and configurations of the present invention will become better understood with reference to the following description and the appended claims.

BRIEF DESCRIPTION OF THE DRAWINGS

FIG. 14 shows a stages overview screen of the recipe editor of the modular reactor system;

FIG. 18 shows a front perspective view and a rear perspective view of a front member of the reactor clamp of FIG. 16;

FIG. 19 shows a cross-section of the front member of FIG. 18;

FIG. 20 shows a representation of the position of a reactor lid and a reactor mouth when the pressure in the reactor vessel is below a threshold pressure;

FIG. 21 shows a representation of the position of the reactor lid and the reactor mouth when the pressure in the reactor vessel is above the threshold pressure;

DESCRIPTION

Overview

Figure 1:
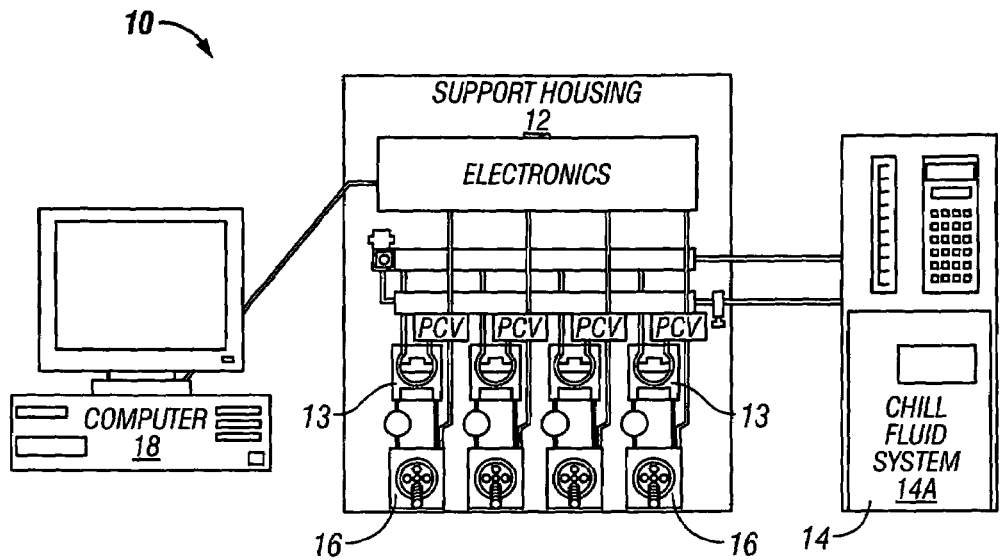
FIG. 1 shows a block diagram of a modular reactor system.
Figure 2:
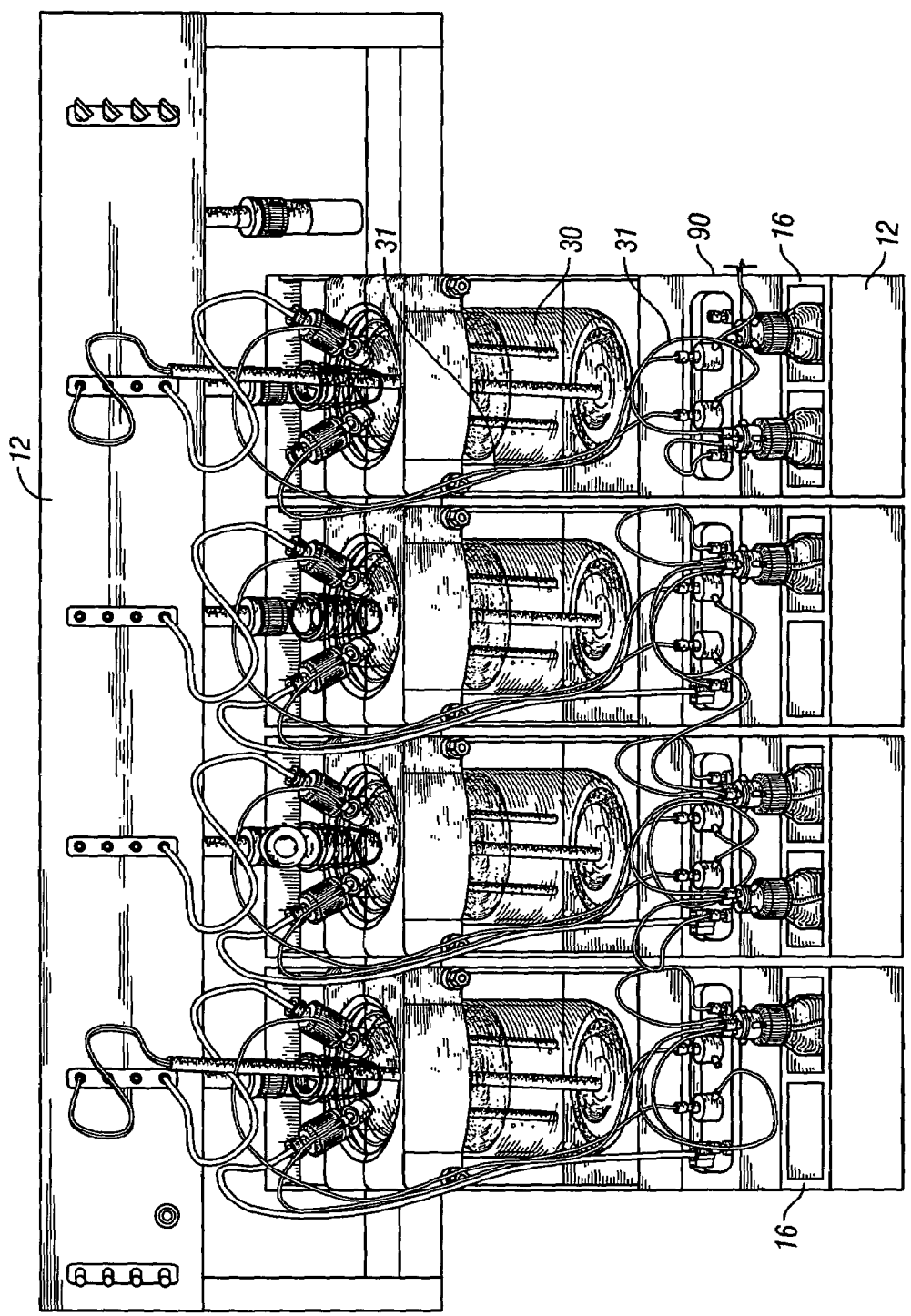
FIG. 2 shows an elevational view of a plurality of modules installed in a backplane unit of the modular reactor system of FIG. 1.

With reference to FIGS. 1 and 2, a modular reactor system 10 comprises a support housing or chassis 12 capable of releasably holding multiple reactor modules 16 (also referred to herein as simply "modules"). A plurality of module seats are provided for holding the reactor modules 16. Each reactor module 16 holds a reactor vessel 30 that may be used to conduct experiments. A plurality of laboratory instruments, such as motors, switches, sensors and pumps are included within the support housing 12 and associated with each seat of the support housing. A plurality of laboratory instruments are also provided on each of the reactor modules 16. These laboratory instruments are utilized to perform work on the contents of the reactor vessels 30 when the modules 16 holding the reactor vessels 30 are positioned in the support housing 12. The support housing 12 is also referred to herein as the "backplane", as it provides the background platform for one or more laboratory instruments and/or module 16 connections. A computer 18 is connected to the backplane, and the laboratory instruments within the backplane 12 are in communication with the computer 18. Laboratory instruments on the reactor modules 16 are in communication with the computer 18 when the reactor modules are positioned within the backplane 12. Each laboratory instrument may be independently controlled by the computer, regardless of the seat or module associated with the laboratory instrument. To this end, a first laboratory instrument associated with one module or seat may be activated without activation of a similar laboratory instrument associated with a different module or seat. A thermal control unit 14 includes a plurality of individual reactor thermal control systems 13 and a chill fluid system 14A. As described in further detail herein, the individual reactor thermal control systems 13 work with the chill fluid system to provide thermal control fluid to the reactors in the reactor modules when the modules are properly seated in the backplane. The computer 18 is also in communication with the thermal control unit 14, and the thermal control unit is arranged to provide independent temperature control for each reactor vessel in each module.

Backplane

Figure 3:
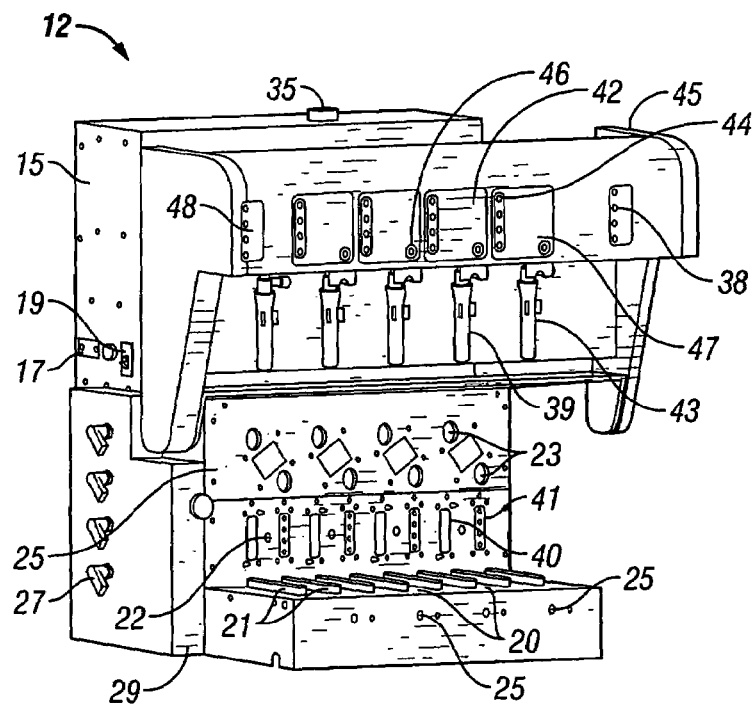
FIG. 3 shows the backplane of FIG. 2 with no modules installed.

With reference to FIG. 3, the backplane 12 includes a plurality of module seats 20 designed to releasably hold the reactor modules 16. The term "slot" is also used herein to refer to a module seat 20. Each slot 20 is defined by two module guide rails 21. The module guide rails 21 are sized to receive a base portion 83 of one of the reactor modules 16 (see FIG. 9). The module guide rails include slits extending along the guide rails that are designed to receive a lip 81 on the module base 83 (see FIG. 9). Pinion gears may be included along the side rails and slits in order to mesh with a slotted rack on the lips of the module. This rack and pinion mechanism provides for smooth insertion of the modules into the slots 20 of the backplane 12. A crank device or mechanism that drives the pinion gears (not shown) may also be provided in association with each slot to assist with full insertion of the module into the slot. For example, the crank device may be activated to pull the module further into the slot using the slotted rack on the lips 81 of the module. In one embodiment, access to the crank device could be provided through holes 25 located at the base of the backplane, and the crank device may be rotated using a screwdriver or similar elongated rotation device.

A plurality of electrical connectors 40 are positioned in the backplane above the slots 20, such that each electrical connector is associated with one of the slots. Each electrical connector 40 is designed to mate with an electrical connector on a reactor module 16 when the reactor module is placed in the slot. Gas line connections 41, two fluid ports 23, and a backlight 25 are also provided directly above each slot 20. The gas line connectors 41 are designed to mate with gas line connectors on each module. The gas line connectors 41 not only provide a connection between the modules and the gas lines in the backplane, but also provide a connection to a vacuum and/or pressure source also located in the backplane. The fluid ports 23 provide a connection to the fluid circulated in the thermal control unit. The backlights 25 provide a light source to assist with viewing the contents of the reactors when modules holding the reactors are seated in the backplane. Furthermore, an identification reader 22 in the form of an electric tag reader is provided in each slot. The identification reader 22 is positioned within the slot to read an identification placed on one of the modules that is placed in the slot. The identification on each module is an electronic tag that can be read by the electronic tag reader 22.

The backplane 12 also includes a top canopy 45 that sits above the slots 20. The top canopy 45 includes a front panel 42 that includes a number of input/output devices related to the laboratory instruments. In particular, the front panel 42 includes a number of receptacles 44 used to receive electronic information from laboratory instruments/transducers included on the reactor modules. For example, receptacles 44 are provided for receiving measurements/signals related to temperature, such as the temperature of the reactor contents, the temperature of the vapor within the reactor, and/or the temperature of the ambient air. A receptacle 44 is also provided for receiving measurements/signals indicating the pH level of the reactor contents. Furthermore, an auxiliary receptacle 44 is provided for receiving other electronic signals/measurements related to the reactor. For example, the auxiliary receptacle could be used with a sensor to measure and/or control the pressure within the reactor or the volume of fluid within the reactor. The receptacles 44 are positioned on the top panel 42 in sets associated with each slot.

Gas flow knobs 48 are also provided on the top panel 42. One gas flow knob 48 exists for each slot of the backplane. Each of the gas flow knobs 48 controls a valve in a gas line located in the backplane 12 that is fed with inert gas from a delivery manifold connected to a large tank (not shown) positioned exterior the backplane. The gas lines in the backplane 12 direct gas between the tank and the gas line connectors 41 associated with the slots 20. Accordingly, an inert gas can be directed to each module 16 placed in the backplane. Turning the knobs 48 will control the valves to allow more or less gas to flow through the gas lines in the backplane. A plurality of bubbler path switches 38 are also provided for each gas line in the backplane. If one of the bubbler path switches 38 is activated, the flow of the inert gas to a particular module is directed through a reactor bubbler 39 located directly above the slot 20 holding the module 16. The bubbler 39 provides a visual indication of the amount of gas flowing through the gas line in the housing to the module. A system bubbler 43 is also provided to provide a visual indication that the gas in the delivery manifold is being refreshed.

A vent port 46 is provided above each slot 20, next to each set of receptacles. A tube from the reactor vessel 30 to the vent port 46 may be used to vent the inert gas and/or reaction fumes away from the reactor vessel. This vent port 46 includes a valve and pressure transducer that can be closed to measure reactor pressure. To this end, the backplane is typically placed in a laboratory hood (not shown) so that gasses and fumes leaving the reactor vessels are vented out of the laboratory through the hood. At the same time, a clean air inlet 35 is provided into the backplane. This inlet 35 provides a source of clean air that may be used to purge or dilute other gasses within the backplane or those created during an experimental process.

In addition to those discussed above, a number of other I/O devices may be provided on the top panel or elsewhere on the backplane 12. For example, output devices such as LEDs and other display means could be provided to indicate temperature warnings (e.g., excessive temperature warning) or instrument operation (e.g., coolant is flowing).

A variety of laboratory instruments may also be included in the backplane under the top canopy 45 and behind the top panel 42 above each slot. For example, a robotic arm (not shown) may be provided under the top canopy 45 of the backplane. Of course, the instruments in the backplane 12 may be mounted on other locations of the backplane and do not need to be mounted under the top canopy 45 and/or behind top panel 42. The robotic arm may be used to accomplish tasks that may be necessary during any particular experiment, such as taking samples from a particular reactor.

Figure 4A:
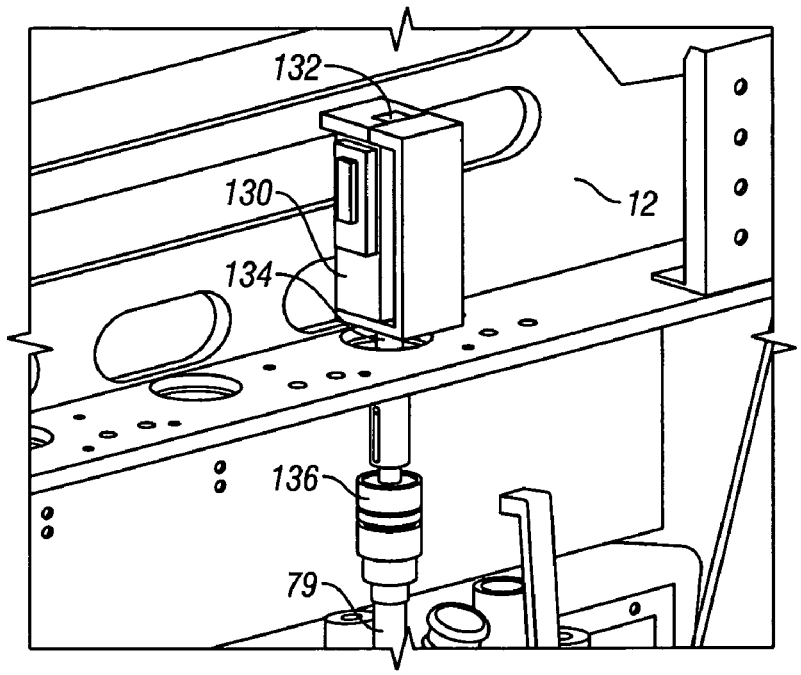
FIG. 4A shows a motor installed in the backplane of FIG. 3.

Other instruments which may be included in the backplane are electric motors. For example, according to one embodiment, electric motors used for stirrers are mounted behind top panel 42 above each slot. These electric motors may be connected to stirring shafts that extend into the reaction vessels 30 when the modules 16 are placed in the slots 20 of the backplane 12. The electric motors are not shown in FIG. 3, but the position of an electric motor behind the backplane is indicated by reference numeral 47. A view of a motor 130 positioned under the top canopy 45 is shown in FIG. 4. The motor 130 is held within a mount 132 that is connected to the backplane 12. The motor includes driveshaft 134 that is connected to a stirrer shaft 79 by a quick connect device 136.

Because the reactor vessel 30 is not permanently attached to the backplane 12, misalignment between the reactor vessel 30 and the stirring shaft 79 may occur. One way that known systems compensate for this misalignment is through the use of spring couplers. Another approach relies upon the use of a flexible tube in line between the shaft 79 of the stirrer motor and a Teflon® coated shaft which extends into the reactor. Both of these solutions, however, create additional problems. For example, both solutions result in side loading of the shaft. Accordingly, removal of the stir shaft is made more difficult. Moreover, the side loading on the shaft results in wear of the shaft and/or the seal at the point the shaft enters the reactor. This wear may result in contamination of the reaction mixture, loss of pressure control in the reactor, or even shaft failure.

Figure 4B:
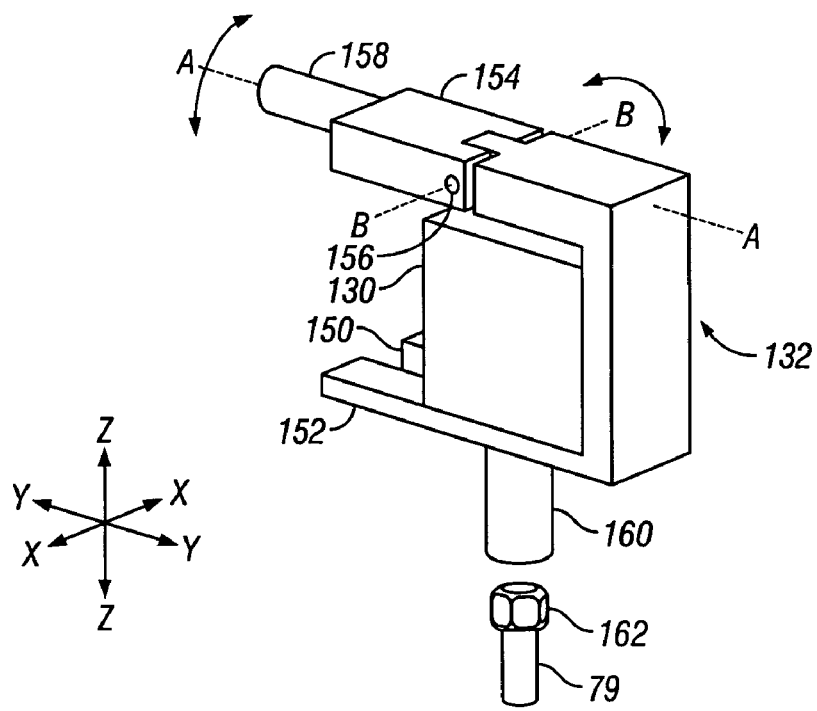
FIG. 4B shows a mount used with the motor of FIG. 4A.

According to one embodiment of the modular reactor system, a stirrer system is provided which avoids the problems associated with known systems by allowing for the effect of movement of the stirrer system in the X-Y plane. Referring to FIG. 4B, one embodiment of a stirrer system is further described. Motor 130 is attached to mount 132. Mount 132 comprises counter-balance arms 150 and 152. Mount 132 is pivotably connected to rotatable base 154 by a pin which is inserted through hole 156. Rotatable base 154 is fixedly connected to shaft 158. Also shown in FIG. 4B is telescoping shaft 160 which is internally shaped so as to receive universal ball 162 which is fixedly connected to stirrer shaft 79.

To connect telescoping shaft 160 to universal ball 162, an operator pulls telescoping shaft 160 downward until it nears universal ball 162. If universal ball 162 and telescoping shaft 160 are misaligned, the operator may rotate shaft 158 to obtain rotation about axis A, having the effect of moving the telescoping shaft along the X-axis. Alternatively and/or additionally, the operator may pivot motor mount 132 about the pin inserted in hole 156, resulting in motion about axis B, having the effect of moving the telescoping shaft along the Y-axis. Thus, telescoping shaft 160 may be positioned over universal ball 162 such that when telescoping shaft 160 is turned by motor 130, universal ball 162 and stirrer shaft 79 are caused to rotate. According to one embodiment, counterbalance arms 150 and 152 are movable, such that telescoping shaft 160 may be positioned near universal ball 162 by moving counterbalance arms 150 and 152.

Those of skill in the relevant art will recognize that a number of alternative embodiments exist for the stirrer system of the present invention. By way of example, but not of limitation, the ball may be located on the motor shaft. Alternatively, a third piece may be used which provides coupling between the motor shaft and the stirrer shaft. Moreover, springs may be used to bias the coupling means. This is useful, for example, for embodiments wherein it is desired to make coupling of the motor shaft to the stirrer shaft automatic upon insertion of the reactor module into the backplane. A number of alternative embodiments are also possible regarding the counterbalance arms. By way of example, but not of limitation, the counterbalance arms may be movable about a plurality of axes. According to another embodiment, the location of the motor within the mount serves to counterbalance the system. The salient characteristic is the ability to minimize side loading of the stirrer shaft when the alignment between the stirrer shaft and the motor shaft is varied.

With reference again to FIG. 3, the backplane further includes a trunk 15 that acts as the housing for electric wiring, gas lines, and the electronics box for the backplane. The top canopy 45 and the slots 20 are connected to and supported by the trunk 15 of the backplane. The trunk 15 includes a power inlet 17 for receiving a power cord. The trunk also includes a power switch 19. In addition, the trunk 15 includes vacuum switches 27 that are operable to turn on or off the vacuum provided to each slot of the backplane. Furthermore, a main gas supply connection 29 is provided through the trunk 15. This connection allows a gas line to be easily connected to the backplane, so the gas can be provided to each slot and module positioned within the backplane.

Figure 5:
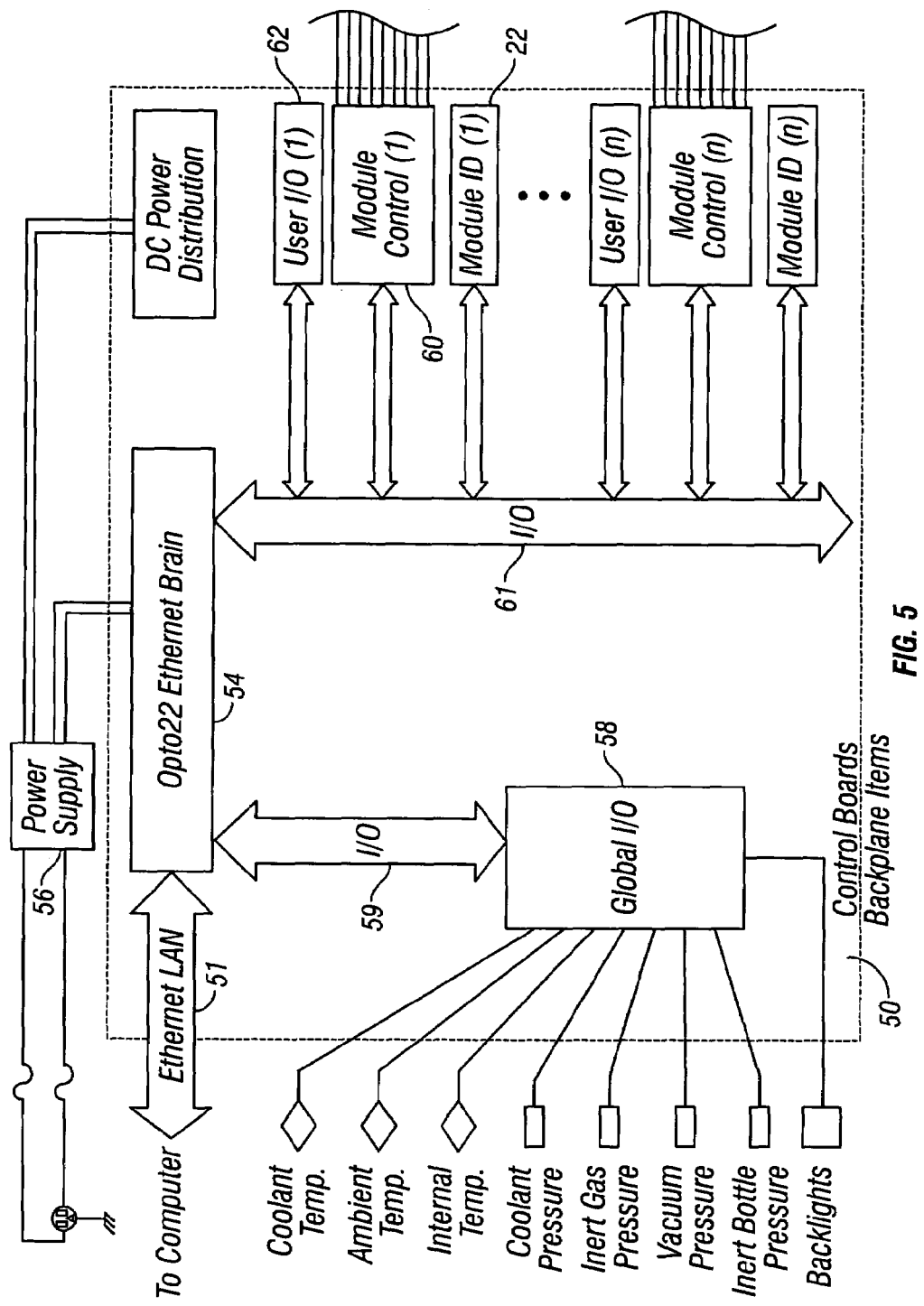
FIG. 5 shows a block diagram of a control board for the modular reactor system.

A control board 50 is positioned within the trunk 15 of the backplane 12. With reference to FIG. 5, the control board 50 is a circuit board that serves as the interconnection between the computer 18 and the electronic instruments within the backplane. A standard RS-232 interface is used to connect the computer 18 to the control board. This connection may be a direct connection, connection over a local area network, or even a wide area network. The control board 50 includes a processor 54 that communicates with software on the computer 18 to control all instruments and output devices connected to the backplane 12. Furthermore, the processor 54 receives information from various sensors and other system inputs through the backplane 12 and passes the information on to the computer 18 at designated times.

As shown in FIG. 5, the processor 54 is powered by power supply 56. The processor 54 is connected to global I/O unit 58 through bus 59. The global I/O unit 58 transfers signals to and receives signals from the I/O devices on the backplane that are not associated with a particular module. For example, the global I/O unit 58 receives signals related to the presence of a vacuum at vacuum switch 27, the flow of gas through a main gas line, the flow of fluid through the thermal control unit 14, the temperature of the fluid, the ambient air temperature, and the internal temperature of the backplane. The global I/O unit 58 also controls the state of the backlights associated with each slot of the backplane. The processor 54 is further connected to a number of dedicated module control units 60, user I/O units 62 and module ID units 22 (referenced above as "identification readers") through bus 61. The module control units 60 transfer control signals to particular modules 16 positioned in the slots 20 of the backplane 12, and receive inputs related to the particular modules. For example, one of the module control units 60 may relay signals instructing one of the motors 130 to spin, thereby operating the stirrer connected to the motor. As another example, one of the module control units 60 may receive a temperature input from one of the modules that is then passed on to the processor 54 and computer 18.

Figure 6:
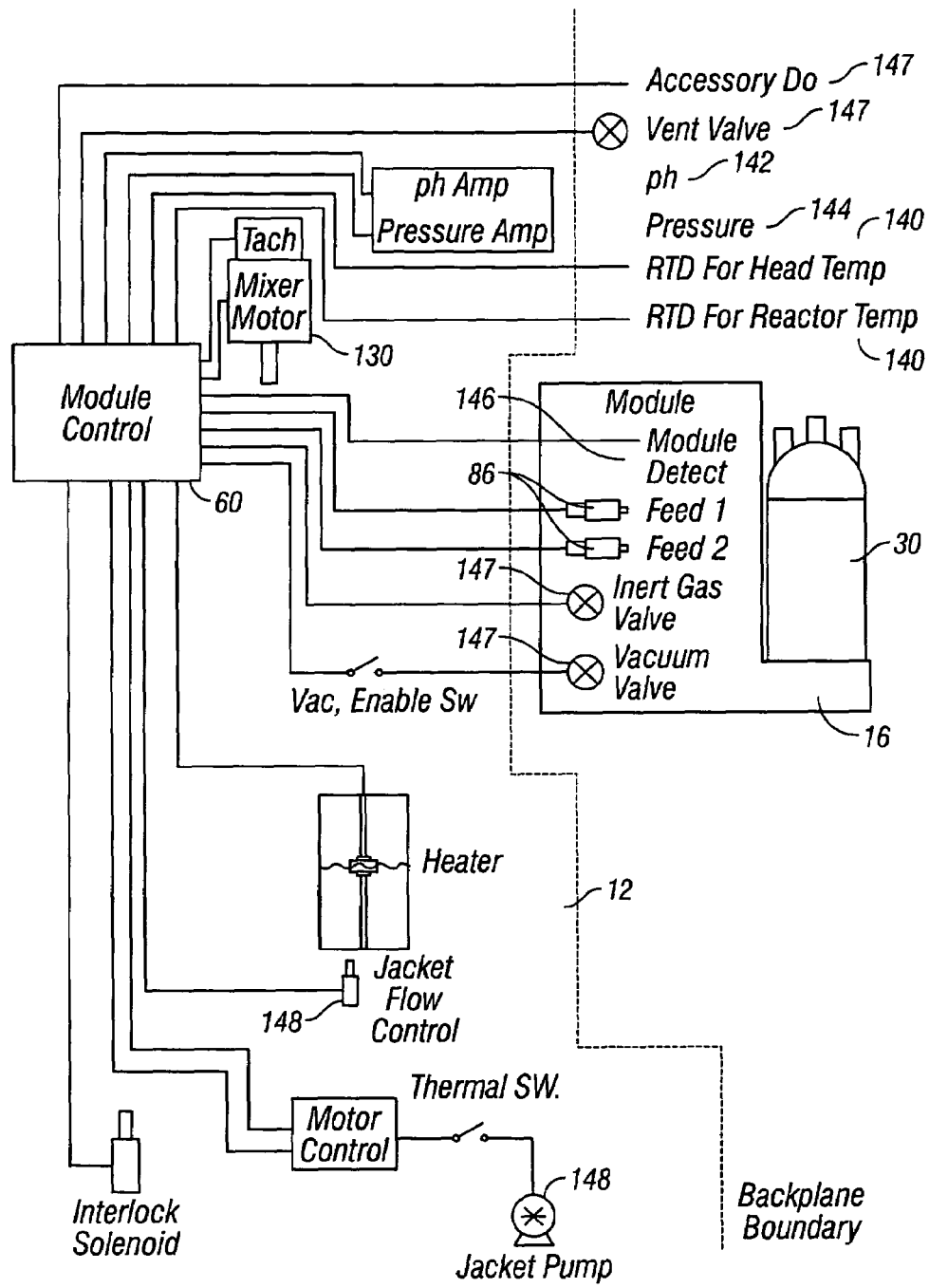
FIG. 6 shows a block diagram of various connections between the control board of FIG. 7 and various laboratory instruments.

FIG. 6 shows the connection between a module control unit 60 and various laboratory instruments associated with a particular module 16. For example, readings from temperature probes 140, a pressure probe 144, a pH probe 142, and a module detect 146 are all delivered to the module control 60. In addition, the module control unit 60 provides control signals to the reagent feed pumps 86 positioned on the module. The module control unit 60 also controls various valves 147 within the backplane, such as gas valves, vacuum valves, and vent valves, that may be used in association with the module 16. Furthermore, the module control unit 60 controls other devices 148 related to operation of the thermal control unit, including pumps and valves, that may be used to control the temperature of the reactor 30 positioned in the module 16.

With reference again to FIG. 5, the user I/O units 62 receive instructions from the user of the modular reactor system related to an individual module positioned in a slot of the backplane. The module I/O units also deliver outputs to the user of the modular reactor system related to an individual module positioned in a slot of the backplane. To this end, the module I/O units 62 monitor and control various user interfaces. For example, the module I/O units receive inputs related to whether a user has manually opened or closed one of the bubbler path switches 38. In addition, the module I/O units may be used to provide warnings related to particular modules, such as a warning light indicating that the reactor in a particular module has reached a critical temperature and is overheating.

In the embodiment of FIG. 5, each module ID unit 22 is associated with one of the slots of the backplane 12. When a module is positioned in one of the slots, the module ID unit 22 associated with that slot is operable to read the electronic tag located on the module positioned in the slot and thereby identify the specific module positioned in the slot. The module ID unit 22 then relays the identification of the module to the processor 54 and computer 18. Based on the particular module ID unit 22 that reports a reading, the computer can recognize a particular module in a particular slot of the backplane 12. This provides the system with the ability to distinguish one module over another module in any given slot, and thereby carry out specific instructions for that module, regardless of the slot in which the module is placed.

Reactor Modules

Figure 7:
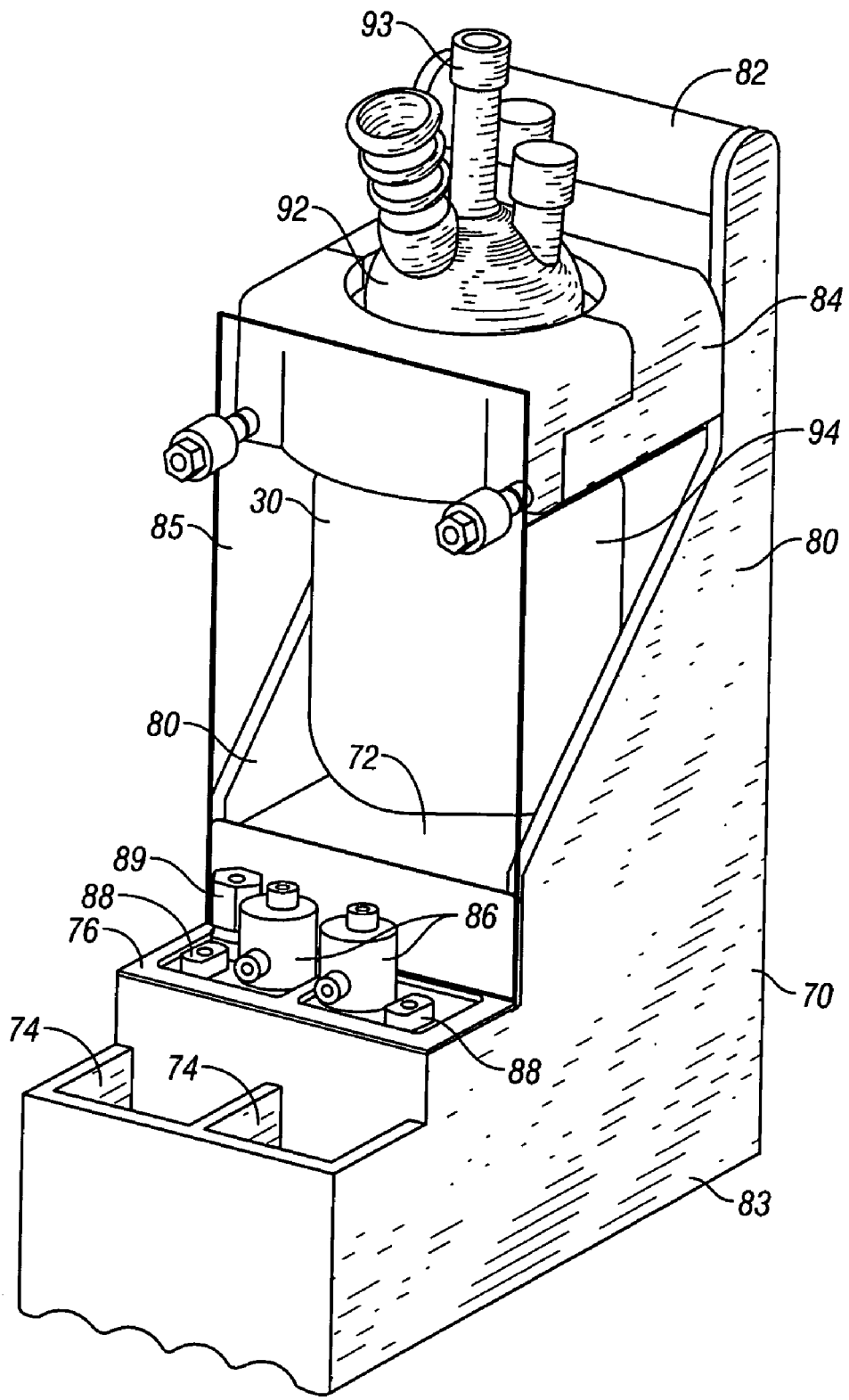
FIG. 7 shows a front perspective view of one of the modules of FIG. 2.
Figure 8:
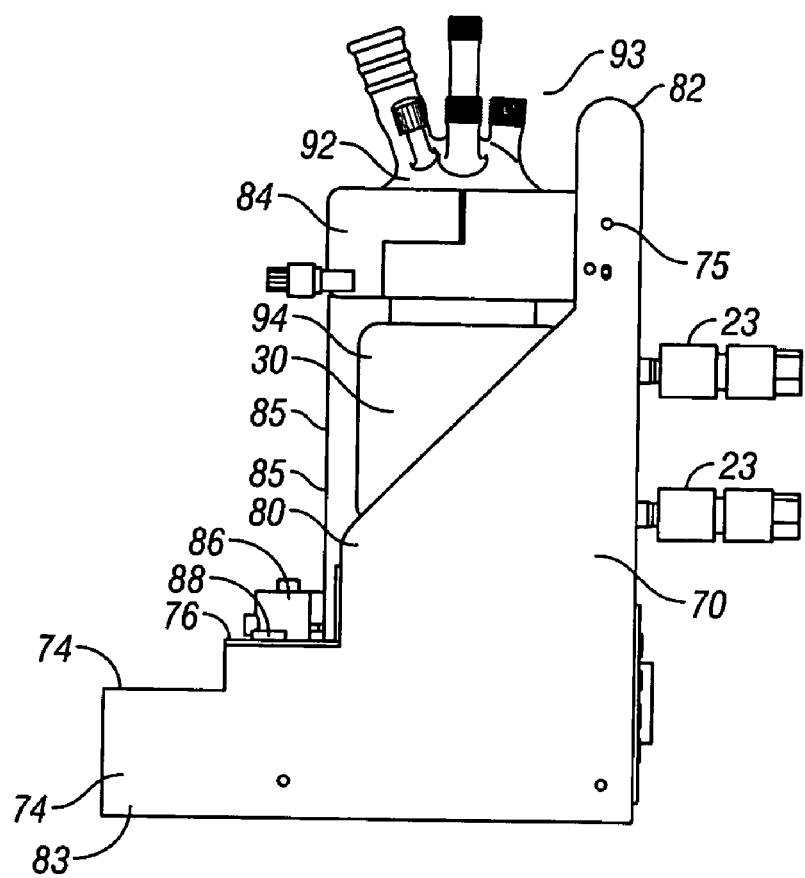
FIG. 8 shows a side view of the module of FIG. 7.
Figure 9:
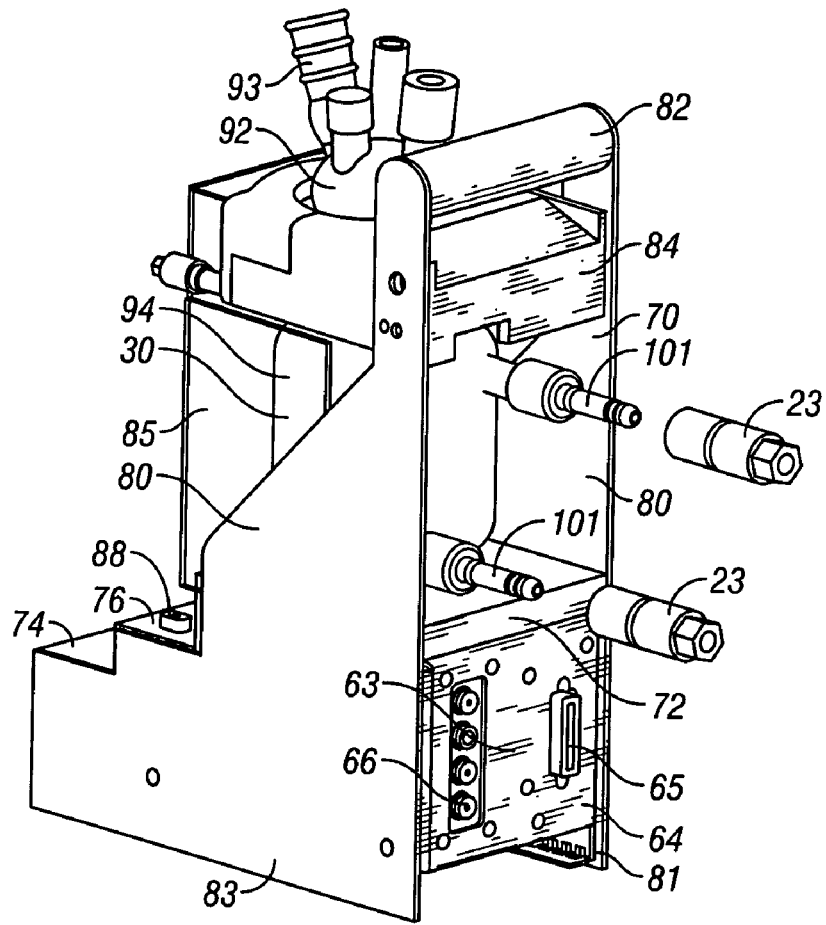
FIG. 9 shows a back perspective view of the module of FIG. 7.

With reference to FIGS. 7–9, each reactor module includes a module shell 70 and a reactor 30 for holding reaction contents. The module shell 70 is sturdy and typically comprised of steel or other metallic material. Of course other rigid materials could be used to form the module shell 70. The module shell 70 includes two sidewalls 80 and a top handle 82 bridging the two sidewalls. A reactor seat 72 holding a reactor 30 is positioned between the two sidewalls 80. A reactor clamp 84 extends horizontally from the top handle 82 so the clamp 84 is positioned directly above the reactor seat 72. A protective shield 85 is fastened to the reactor clamp and extends to the reactor seat 72. The protective shield 85 is transparent and comprised of polycarbonate or other material resistant to shattering. The protective shield 85 provides a barrier between an individual and the thermal fluid flowing through the reactor jacket, and thus provides a safety device that helps to block an individual watching an experiment in the reactor 30 from escaping thermal fluid should the reactor 30 shatter. The backlight 25 in the housing is positioned to shine through the reactor 30 and protective shield 85 to provide improved viewing of the reactor.

A module lip 81 is located along the base portion 83 of each sidewall 80. Each module lip 81 is designed to interact with a rail 21 located in one of the slots 20 of the backplane 12, and thereby secure the module in the slot of the backplane. As mentioned previously, the lip may include a slotted rack designed to mesh with pinion gears on the side rails and thereby assist with smooth insertion of the module into the slot.

An instrument box 76 is positioned below and in front of the reactor seat 72, between the two sidewalls. The instrument box 76 carries two pumps 86, two gas fittings 88, and a pressure/vacuum fitting 89. Two reagent seats 74 are located below and in the front of the instrument box 76. The reagent seats 74 are dimensioned to hold two bottles/vessels 90 (see FIG. 2) containing reagents to be added to the reactor 30 during the experiment. The pumps 86 are used to transfer reagents in the reagent bottles 90 to the reactor 30. To accomplish this, tubes 31 (see FIG. 2) are extended between each reagent bottle 90 and the pumps 86. Additional tubes 31 are extended from the pumps 86 to the reactor 30. Operation of one of the pumps 86 draws reagent from the reagent bottle 90, through the pump 86 and into the reactor chamber 96 (see FIG. 10A). Tubes also extend from the gas fittings 88 to the reagent bottles 90 and/or the reactor 30. The tubes connected to the gas fittings 88 provide an inert gas to the reagents 90 and/or the reactor chamber 96. Furthermore, a tube (not shown) extends from the pressure/vacuum fitting 89 to the reactor 30. This tube may be used to apply a pressure or vacuum to the reactor 30 during an experiment. Any number of flexible laboratory tubes and fittings known to those of skill in the art may be used to make the above-described connections.

Figure 10A:
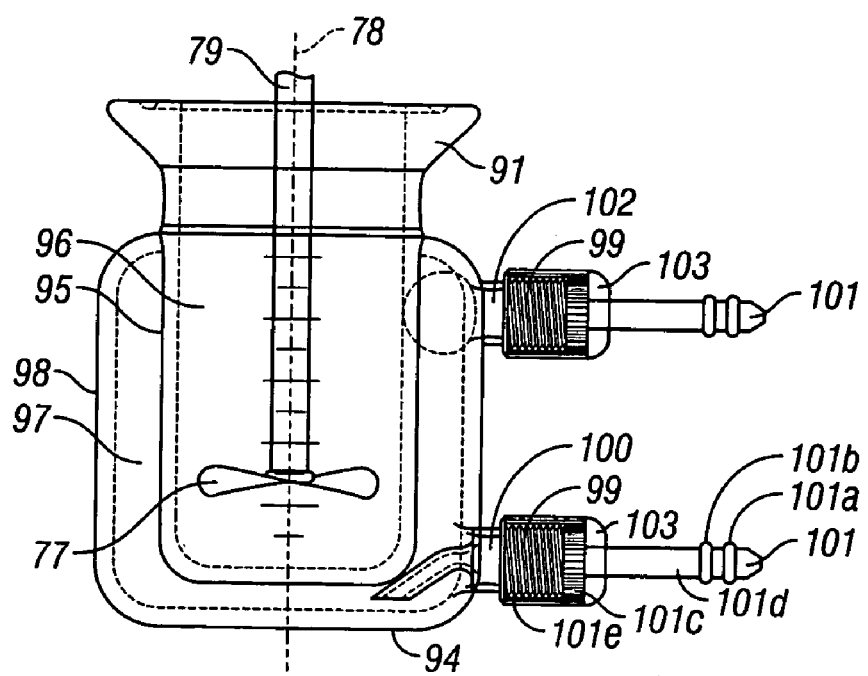
FIG. 10A shows an elevational view of an exemplary reactor for use with the modular reactor system.
Figure 22:
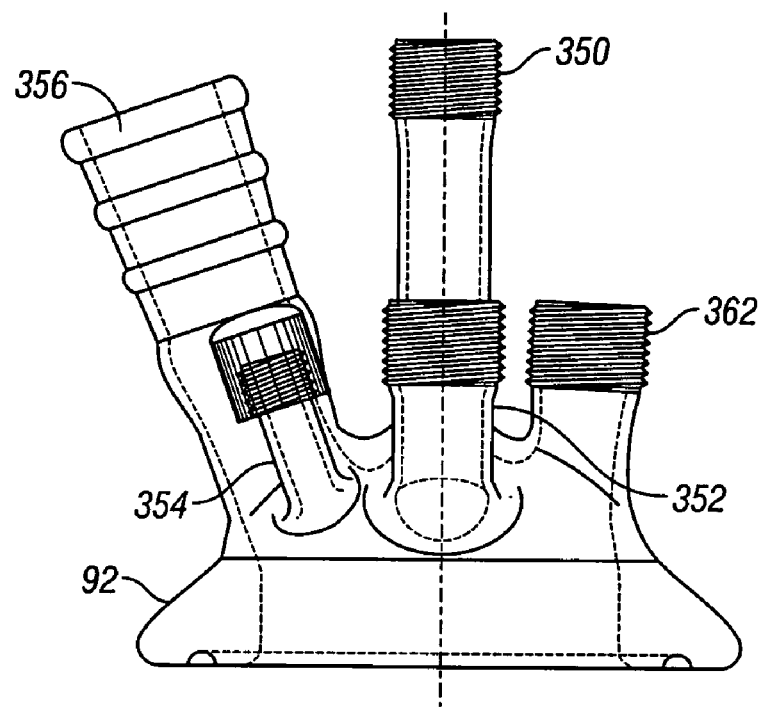
FIG. 22 shows a side view of a reactor lid.

The reactor 30 sits in the reactor seat 72 of the module shell and is held securely to the module shell by reactor clamp 84. The reactor 30 is typically comprised of glass, or other material impervious to most chemical reactions. As shown in FIG. 10A, the reactor 30 includes an exterior reactor wall 98 that surrounds an interior glass wall 95 to form a thermal control chamber 97 there between. The interior glass wall 95 defines a reactor chamber 96 where reagents and other solutions are introduced when conducting experiments in the reactor. A reactor mouth 91 is located at the top of the reactor and leads to the reactor chamber 96. A reactor lid 92, as shown in FIG. 22, is removably positioned on top of the reactor mouth 91. An o-ring is placed upon the reactor mouth 91 to facilitate sealing of the reactor lid 92 to the reactor mouth 91. A reactor junction is formed in the area where the reactor mouth 91 seals to the reactor lid 92. As used herein, the term "reactor junction" is not limited to the portions of the reactor mouth 91 and reactor lid 92 that physically seal, but also include portions of the reactor mouth and reactor lid immediately adjacent thereto, including external portions of the reactor mouth and reactor lid that lead immediately to the sealing portions.

Figure 23:
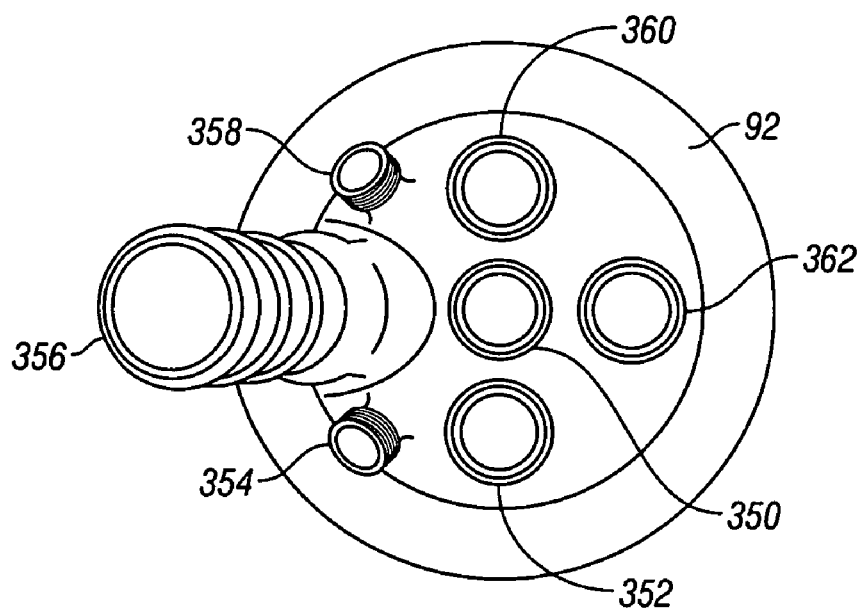
FIG. 23 shows a top view of the reactor lid of FIG. 22.

Referring to FIGS. 22 and 23, the reactor lid 92 includes a number of lid ports 93 that provide access into the interior of the reactor. The lid 92 includes a stirrer port 350 positioned at the top center of the reactor lid 92. The stirrer port 350 is designed to accept the stirrer shaft 79 of a mechanical agitator in order to stir the contents of the reactor chamber 96. Peripheral ports 352, 354, 356, 358, 360 and 362, are each provided for additional access to the reactor chamber 96 through the lid 92. These peripheral ports may be used to insert various laboratory instruments and feed lines into the reactor chamber. For example, the peripheral ports may be used to insert an automated sampler, temperature probes, pH probes, inert gas feeds, and reagent feeds into the reactor chamber. Peripheral ports 352, 360 and 362 are designed with a standard ChemThread® No. 12 thread pattern. Feed ports 354 and 358 are each designed with a standard ChemThread® No. 4 thread pattern. Peripheral port 356 is designed with a standard taper "24/40" type female connector. As shown in FIG. 23, peripheral ports 352, 356, 360 and 362 are all spaced 90° apart around stirrer port 350. Peripheral ports 354 and 358 are each spaced 45° apart from peripheral port 356.

With reference again to FIG. 10A, the exterior glass wall 98 defines a temperature regulation chamber 97 with the reactor 30. The temperature regulation chamber 97 may also be referred to herein as a "jacket" or a "cooling chamber", but it is recognized that the chamber holds fluid that may assist in cooling or heating the contents of the reactor. An inlet port 100 and an outlet port 102 are provided in the exterior glass wall 98. The inlet port 100 and outlet port 102 each include a threaded portion 99. In addition, both the inlet port 100 and the outlet port 102 have a "quick connect" attachment 101 positioned thereon. As used herein, the term "quick connect attachment" or "quick connect connector" refers to a connection device that facilitates easy and secure connection to an accompanying connector by simply inserting one quick connect connector into an accompanying connector without the need for tightening, twisting or otherwise clamping or locking the connectors together. Plastic threaded sleeves 103 screw on to the threaded portion of inlet port 100 and outlet port 102 to secure the quick connects to the ports 100 and 102. The quick connect attachments 101 on the reactor 30 are designed to mate with complimentary quick connect connectors positioned in the fluid ports 23 of the backplane.

Figure 10B:
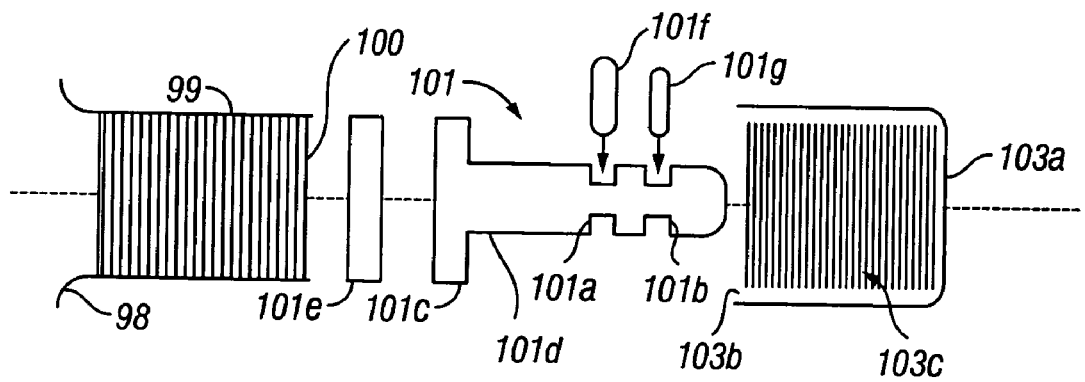
FIG. 10B shows a parts view of a quick connect attachment for the reactor of FIG. 10A.

With reference to FIG. 10B, quick connect attachments 101 include a base element 101c. A shaft 101d (also referred to herein as a "stud") is attached to the base section 101c. A first O-ring groove 101a and a second O-ring groove 101b are circumscribed about shaft 101d. O-rings 101f and 101g, preferably made of an elastomeric compound, are deposited into first O-ring groove 101a and second O-ring groove 101b, respectively. First O-ring groove 101a and second O-ring groove 101b preferably accept the same size of O-ring. The base element 101c has a larger external diameter than shaft 101d. An opening (not shown) extends through the center of shaft 101d and base element 101c to create a channel through which fluid may flow.

Plastic sleeves 103 are open-ended, hollow cylinders which include first opening 103a, second opening 103b, and sleeve threads 103c. In comparison to quick connect attachments 101, the diameter of first opening 103a is greater than the diameter of shaft 101d, and smaller than the diameter of base element 10c. The diameter of second opening 103b is similar to the external diameter of inlet port 100 and outlet port 102. Along the inside of plastic sleeves 103, starting at second opening 103*b*, are sleeve threads 103*c* which are complimentary to threads 99 of inlet port 100 and outlet port 102.

The quick connect attachment 101 is inserted into the second opening 103*b* of the plastic sleeve 103, shaft 101*d* end first, such that the shaft 101*d* extends out of the first opening 103*a*, but the base element 101*c* remains inside the plastic sleeve 103. The second opening 103*b* of the plastic sleeve 103 is then positioned near the inlet port 100 or the outlet port 102, and the threads 99 are engaged with the sleeve threads 103*c*. The plastic sleeve 103 is rotated until the base element 101*c* of the quick connect attachment 101 tightly abuts the end of the inlet port 100 or the outlet port 103. A base O-ring 101*e*, made of an elastomeric material, is placed between the base element 101*c* and the inlet port 100 or outlet port 102, to create a tighter seal between quick connect attachment 101 and inlet port 100 or outlet port 102. Attaching quick connect attachments 101 to inlet port 100 and outlet port 102 with the use of plastic sleeve 103 creates a rigid connection between the quick connect attachments 101 and the ports 100 and 102. These rigid connections are used to allow the ports 100 and 102 to quickly and easily connect to fluid ports 23 on the backplane 12 when a module is placed in a slot of the backplane. This connection allows for thermal regulation fluid to circulate within the cooling chamber 97, as described in greater detail below.

FIG. 8 shows a reactor 30 installed into a module shell 70. A thermal control system 14 (see FIGS. 10*c* and 10*d*) is connected to a backplane 12. Fluid ports 23 are fixed to the backplane 12, and are connected to the thermal control system 14. Fluid ports 23 are of a complimentary design to quick connect attachments 101, and include a cavity (not shown) designed to releasably engage the shaft 101*d* of the quick connect attachment 101. The O-rings 101*f* and 101*g*, positioned in the O-ring grooves 101*a* and 101*b*, provide a tight seal between quick connect attachments 101 and fluid ports 23. When engaged with the fluid ports 23, the quick connect attachments 101 allow fluid to circulate from the thermal control system 14, through the cooling chamber 97, and return to the thermal control system 14.

FIG. 9 shows a rear view of a reactor 30 installed into a module shell 70. Quick connect attachments 101 are shown attached to inlet port 100 and outlet port 102 with the use of plastic sleeves 103. Quick connect attachments 101 are shown disengaged from fluid ports 23.

As described above, the quick connect attachments 101 allow the inlet port 100 and outlet port 102 to be quickly and easily connected to the fluid ports 23 in the backplane 12. Connection of the inlet and outlet ports to the fluid ports 23 of the backplane allow thermal control fluid to flow into and out of the cooling chamber 97, thereby controlling the temperature of the contents of the reaction chamber 96. The reaction chamber 96 is dimensioned to a particular reaction volume in which various experiments may be conducted. The reaction volume is typically between 30 ml and 500 ml. Of course, greater reaction volumes are possible, but as the reaction volumes increase, the size of the modules must also increase. The lower end of reaction volume is limited by any minimum volume required to allow use of certain desired laboratory instruments, such as temperature probes, stirrers and sampling probes. For example, a particular temperature probe and stirrer combination may require at least 50 ml of fluid in order for both instruments to operate properly.

A stirrer 78 is also shown in FIG. 10A. The stirrer includes a shaft 79 and propeller 77 used to stir the contents of the reactor 30 during an experiment. Although the portion of the stirring shaft shown in FIG. 10A is free floating within the reaction chamber 96, the stirring shaft actually extends from the reactor chamber 96 through a port 93 on the reactor lid 92. As shown in FIG. 4, a quick connect 136 connection device is used to attach the stirrer shaft 79 to the drive shaft 134 of the motor 130 when the module holding the reactor is positioned within one of the slots 20 of the backplane 12. Of course, the quick connect 136 may take one of several different forms. For example, the quick connect 136 may be a connecting shaft having one end that fits over the stirrer shaft 79 and another end that fits over the drive shaft 134 of the electric motor 130, thereby locking the drive shaft to the stirrer shaft.

Referring again to FIG. 9, each reactor module 16 includes a back plate 64 having an electrical connector 65 and a gas line connector 66 positioned thereon. The electrical connector 65 mates with one of the electrical connectors 40 in the backplane 12 when the module 16 is placed in one of the slots 20. Likewise, the gas line connector 66 mates with one of the gas line connectors in the backplane 12 when the module 16 is placed in one of the slots 20. In this manner, when a module 16 is placed in the slot 20, the module is powered through the backplane 12 and is in electronic communication with one of the control modules of the backplane. Furthermore, a gas pressure and a vacuum source is made available to the module 16 through the gas line connector 66.

An identification in the form of an electronic tag is held by the back plate 64 of the module shell 70. Electronic tags are well known to those of skill in the electrical arts, and are available from a number of commercial sources. As discussed previously, an identification reader 22 is located above each slot of the backplane. When a module 16 is placed in a slot 20 of the backplane, the reader 22 is aligned with the electronic tag held by the back plate 64, allowing the reader to identify the module and distinguish it from other modules in other slots of the backplane 12. Although the electronic tag is not shown in FIG. 9, the electronic tag is retained below the surface of the back plate 64 at the location shown by reference number 63, between the electrical connector 65 and gas line connector 66. In this embodiment, the electronic tag is a radio frequency identification (RFID) tag, allowing the tag to be read by the electronic tag reader without actually contacting the tag. The electronic tag could also be mounted on the surface of the back plate 64 or on any other module location that allows for reading by the tag reader 22. Of course, other types of tags and readers may be used, including optical tags such as bar codes. Other examples of identification that could be used include, without limitation, infrared beacons, mechanical flags, and optical block codes. As another example, the identification could be an electronic identification code magnetically or optically stored in a storage device retained on the module, and the identification reader could be a circuit or microprocessor that retrieves the stored code through the electric connector on the module.

Each reactor module 16 is designed for repeated insertion into and removal from any of the slots 20 of the backplane 12. When this happens, some connections between the module and the backplane occur automatically, while other connections must be made manually. For example, as discussed above, proper insertion of a module into a slot will cause the electrical connectors in the module and the backplane to automatically mate. Likewise, proper insertion of a module into a slot will cause the gas line connectors in the module and the backplane to automatically mate. Furthermore, quick connects 101 will cause the inlet port 100 and outlet port 102 of the reactor to be joined to the fluid ports on the backplane. However, once a reactor module 16 is properly seated in a slot of the backplane 16, the stirring shaft 79 must be manually connected to the drive shaft 134 of the motor 130 using the quick connect coupler 136. Furthermore, the leads of temperature probes 140 may be easily connected to the receptacles 44 dedicated to temperature measurements by plugging the leads into the receptacles. Likewise, the leads of pH probes 144 and other probes may be easily connected to the receptacle 44 dedicated to that particular measurement.

Thermal Control Unit

Once a module 16 is seated in a slot 20 of the backplane 12, one of the reactor thermal control systems 13 may be used to pump heating or cooling fluid (i.e. thermal control fluid) to the associated reactor 30 through the quick connect 101 of the reactor. After reaching the reactor, the thermal control fluid flows in the thermal control chamber 97 of the reactor between the interior glass wall 95 and the exterior glass wall 98 and thereby heats or cools the contents of the reaction chamber, depending upon the temperature of the fluid and the reaction chamber.

In known systems, each reactor may be provided with a dedicated heating element so as to maintain the reactor at or above ambient temperature. In such a system, it is possible to heat various reactors to different temperatures. Some systems further provide a single source of cooling fluid to the entire array of reactors for maintaining temperature of all of the reactors below ambient temperature. When conducting the same process on all reactors in a device, this may be useful. However, these known systems do not allow sufficient flexibility for the module reactor system of the present invention.

Figure 10C:
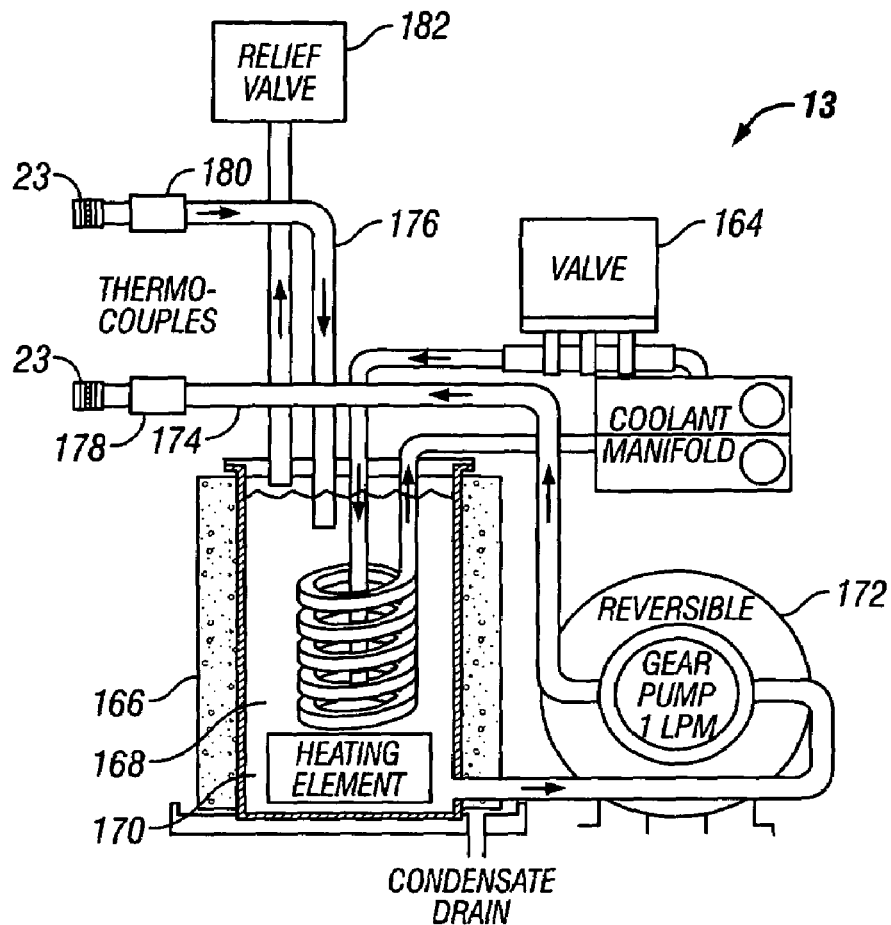
FIG. 10C shows a thermal control system for use in the modular reactor system of FIG. 1.

Accordingly, one aspect of the present invention comprises a thermal control system which allows individual reactors to be maintained at a desired temperature regardless of ambient temperature or the temperature at which other reactors are maintained. Referring to FIG. 10C, one embodiment of the thermal control system of the present invention is described.

FIG. 10C shows the one of the individual reactor thermal control systems 13. Reactor thermal control system 13 comprises a valve 164 and a thermal control fluid reservoir 166. Heat exchanger 168 and heat element 170 are located within thermal control fluid reservoir 166. Thermal control fluid pump 172 takes a suction on thermal control fluid reservoir 166 to pump thermal control fluid through supply line 174. After passing through thermal control chamber 97, thermal control fluid is returned to reservoir 166 by return line 176. Thermocouples 178 and 180 may be provided on supply line 174 and return line 176. Fluid ports 23 are provided on supply line 174 and return line 176. According to this embodiment, fluid ports 23 are designed to automatically engage with quick connects 101 when module 16 is seated in a slot 20 of the backplane 12. Relief valve 182 is provided to maintain a safe pressure in the thermal control fluid reservoir 166 even with expansion and contraction of the thermal control fluid over a range of temperatures.

Figure 10D:
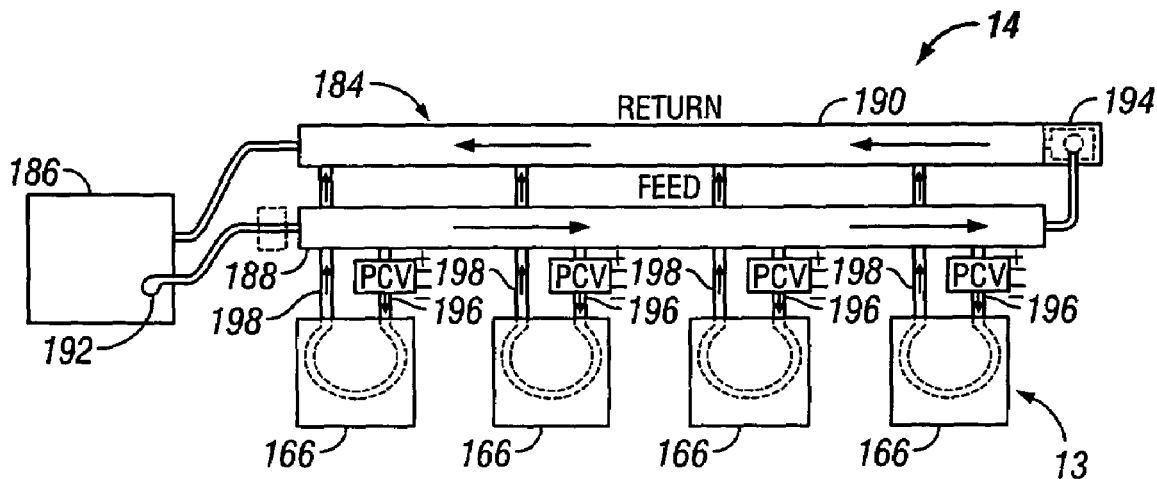
FIG. 10D shows a reactor thermal control system for use in the thermal control system of FIG. 10C.

Cooling for the system in this embodiment is provided by a chill fluid system which is described in reference to FIG. 10D. Thermal control system 14 comprises chill fluid supply system 184 which includes chill fluid reservoir 186, supply manifold 188 and return manifold 190. Chill fluid pump 192 takes a suction on chill fluid reservoir 186 and supplies chill fluid to supply manifold 188. Back pressure control valve 194 maintains the pressure of supply manifold 188 even as the heat load on the system changes, as will be discussed further below. Chill fluid supply manifold 188 provides chill fluid to individual reactor chill fluid systems by chill fluid supply lines 196. Fluid is returned from the reactors by chill fluid return lines 198. In this embodiment, valve 164 is located on the supply line of the reactor chill fluid system, however, it may alternatively be located on the return line.

In operation, thermal control fluid pump 172 takes a suction on thermal control fluid reservoir 166 to constantly pump thermal control fluid through supply line 174. Of course, temperature control software may be used to vary the speed of thermal control fluid pump 172 or even to control thermal control fluid pump 172 on and off in response to sensed conditions or a recipe if desired. Temperature control software may also be used to control heat element 170 as necessary to provide heat to thermal control fluid reservoir 166. Chill fluid to thermal control fluid reservoir 166 is provided by positioning valve 164. This regulates the amount of chill fluid that passes through heat exchanger 168 and cools the thermal control fluid in thermal control fluid reservoir 166.

According to one embodiment, control of valve 164 is effected by temperature control software. Chill fluid flow is controlled by valve 164 since supply manifold 188 of chill fluid supply system 184 is maintained at a positive pressure by back pressure control valve 194 and chill fluid pump 192. Specifically, as a valve throttles opens, the pressure in supply manifold 188 will tend to drop. However, back pressure control valve 20 will throttle shut so as to maintain positive pressure within supply manifold 188, thus assuring a supply of chill fluid to other reactors. Alternatively, a variable speed chill fluid pump may be used to increase supply of chill fluid as a valve throttles open. According to one embodiment, the system is sized such that the pressure within the supply header is maintained at a constant pressure regardless of whether all the valves are full open or full shut.

In accordance with the embodiment of the invention disclosed in FIGS. 10C and 10D, thermocouples 178 and 180 may be monitored by temperature control software and used as input to control the heater and supply of chill fluid. Additional inputs to the temperature control software which may be used include position of the valves, chill fluid pump speed or chill fluid flow, back pressure valve position, chill fluid supply manifold pressure, pressure and temperature of the reactor vessel, and time.

Those of skill in the art will recognize that although one embodiment of the thermal control system of the present invention is described above, the present invention encompasses a number of alternative embodiments. By way of example, but not of limitation, the thermal control system of the present invention may be used with a single reactor vessel or with an array of more than the four shown in FIG. 10D. Additionally, although cooling is provided in the embodiment discussed by chill fluid, any acceptable cooling medium may be used, and the term "chill fluid" as used herein refers to any such acceptable cooling medium. Moreover, the thermal control system need not be automatically connected when a module 16 is placed in a slot 20 of the backplane 12.

Reactor Clamp

In order to facilitate a safe operating environment, a reactor 30 and a reactor lid 92 should, in a preferred embodiment, be securely fastened to a structural framework while a reaction is run inside the reactor 30. With reference to FIGS. 8 and 16–21, a clamp 84 is releasably attached to module shell 70 using clamp attachments 308, which include posts that join with holes 75 in the module sidewalls 80 to secure the clamp to the module shell 70. In operation, the clamp 84 contacts portions of the reactor junction, including portions of the reactor mouth 91 and the reactor lid 92. The clamp 84 is operable to release the reactor lid 92 from the reactor 30 when the pressure within the sealed reactor chamber 96 (formed by the union of reactor 30 and reactor lid 92) reaches a threshold pressure. The term threshold pressure, as used herein refers to the pressure in the reactor chamber 96 required apply sufficient force to the clamp to temporarily release the reactor lid from the reactor mouth, when the clamp is being used to hold the reactor lid to the reactor mouth.

Figure 16:
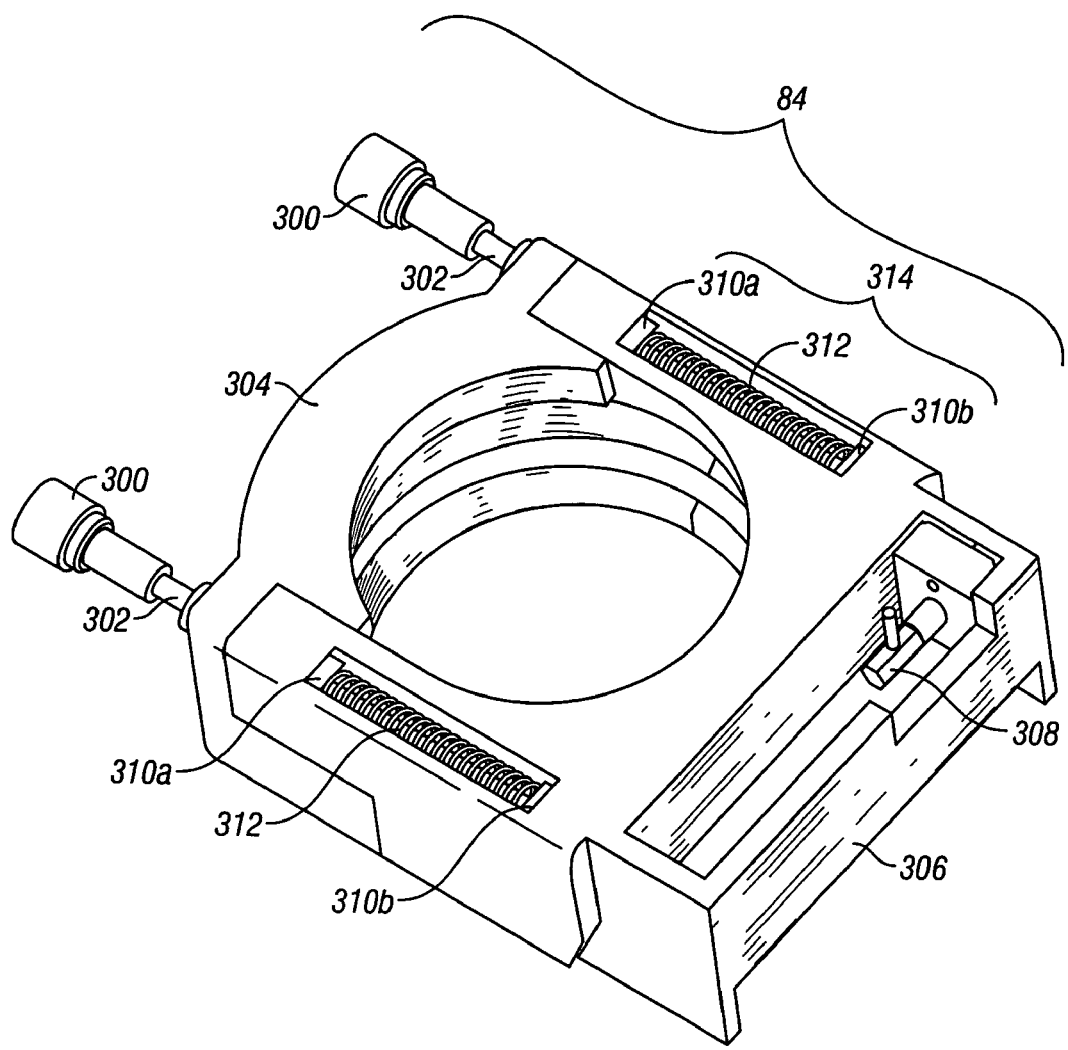
FIG. 16 shows a bottom view of a reactor clamp for use in association with the module of FIG. 7.

FIG. 16 shows a bottom view of clamp 84. The clamp 84 includes a first or front clamp member 304 releasably joined to a second or rear clamp member 306. Retaining bolts 302 extend through bores (not shown) in the front clamp member 304 and into channels 314 in the rear clamp member 306. Each of the retaining bolts 302 includes a knob 300 on the end of the retaining bolts 302 extending from the front clamp member 304. Retaining bolts 302 can include a bar, stud, rod, or other elongated member extending between front clamp member 304 and rear clamp member 306. Nuts 310a and 310b are recessed in the channels 314 of the rear clamp member 306. A spring 312 is retained upon the retaining bolts 302 between nuts 310a and 310b in each channel 314 The retaining bolts 302 extend through the front clamp member 304 and into rear clamp member 306, where retaining bolts 302 also extend through nut 310a. The retaining bolts 302 extend through the springs 312 in the channels 314. Threads on the retaining bolts 302 engage complimentary threads (not shown) on nuts 310b. Nuts 310a do not include threads. Thus, when the retaining bolts 302 are rotated, nuts 310a remain stationary, but nuts 310b travel along the channels thereby compressing or relaxing springs 312, as the case may be. The more the springs compress in the channel, the more force is required to separate the front clamp member 304 from the rear clamp member 306. Accordingly, knobs 300 and retaining bolts 302 comprise an adjusting means, for purposes of adjusting tension in springs 312 and the force holding the first clamp member 304 to the second clamp member 306.

Figure 17:
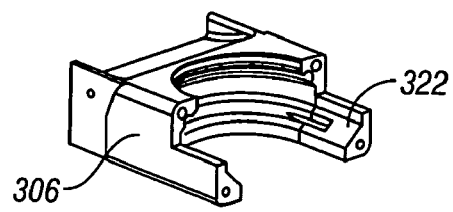
FIG. 17 shows a perspective view of a rear member of the reactor clamp of FIG. 16.

As shown in FIGS. 10A and 20–22, the mouth of the reactor 91 and the bottom of the reactor lid 92 are angled outwardly. As shown in FIGS. 17 and 18, and further illustrated in FIG. 19, an angled edge 322 is inscribed along the inside of the front clamp member 304 and the rear clamp member 306 such that the angled edge 322 is continuous when front clamp member 304 and rear clamp member 306 are joined together. Angled edge 322 includes top angled edge 316 and bottom angled edge 318. Additionally, O-ring grooves 320 are inscribed along top angled edge 316 and bottom angled edge 318. O-rings or partial O-rings (not shown) are deposited into O-ring grooves 320 to assist in providing a cushioned surfaces for contacting the reactor junction and holding the reactor lid 92 to the reactor mouth 91.

When the front clamp member 304 and rear clamp member 306 are joined, and the knobs 300 are tightened, the threads (not shown) on retaining bolts 302 operate on complimentary threads (not shown) on nut 310b such that nut 310b moves closer to nut 310a. The springs 312 between nuts 310a and 310b are compressed by the movement of nuts 310b. The compression of the springs 312 serves to impart a force which biases the knob ends of the bolts toward the channels 314 of the rear clamp member 306. This causes the knobs 300 to press against the front clamp member, or the shield 85, if shield 85 is installed, and bias the front clamp member 304 toward rear clamp member 306, thereby tightly joining the front clamp member to the rear clamp member. When the clamp is installed on the reactor junction, the angled edge 322 inside the clamp 84 forces the reactor 30 and the reactor lid 92 together tightly by top angled edge 316 (or a surface associated therewith, such as an O-ring) pressing down against the outwardly angled bottom of the reactor lid 92, and bottom angled edge 318 (or a surface associated therewith, such as an O-ring) pressing up against the outwardly angled top of the reactor 30 (i.e., the reactor mouth 91). FIG. 20 shows an exploded, cut-away view of the reactor 30 and the reactor lid 92 pressed together by top angled edge 316 and bottom angled edge 318. An o-ring 317 is shown positioned between the reactor lid 92 and the reactor mouth 91. As the springs are further compressed, the forces acting against the reactor lid and the reactor mouth increase. Alternative means for biasing front clamp member 304 against rear clamp member 306 (and thereby creating forces biasing the reactor lid 92 to the reactor mouth 91) include using an elastomeric band or string, a gas or liquid pressure apparatus, or a flexible metal apparatus.

Referring again to FIG. 7, clamp 84 is attached to module shell 70, and the clamp 84 is also attached to reactor lid 92 and reactor 30. Reactor O-ring grooves (not shown) are inscribed about the top of the reactor 30 and the bottom of the reactor lid 92. The union of the reactor 30 and the reactor lid 92, along with the inclusion of an elastomeric O-ring (not shown) into the reactor O-ring grooves 320 creates a sealed reactor chamber 96. When the reactor lid 92 and the reactor 30 are attached to the clamp 84, and knobs 300 are tightened, the angled edges 322 of the clamp 84, as shown in FIG. 10d, ensure that the reactor lid 92 and the reactor 30 are sealably engaged as long as the pressure within the reactor vessel remains below some threshold pressure. Under reaction conditions inside the reactor chamber 96, a reaction may evolve a gas, which creates a pressure inside the reactor chamber 96 greater than the pressure of the surrounding atmosphere. Under high pressure inside the reactor 30, gas pressure pushes the reactor lid 92 away from the reactor 30. Under this high pressure, the reactor lid 92 applies a force to the top angled edge 316, and the reactor 30 applies a force to the bottom angled edge 318. The vertical separation force imparted by the reactor 30 and the reactor lid 92 is converted into a horizontal force by top angled edge 316 and bottom angled edge 318. At a threshold internal reaction chamber pressure, this applied horizontal force causes the springs 312 inside the clamp 84 to contract further, which allows front clamp member 304 to slightly separate from rear clamp member 306. The disengaging of front clamp member 304 from rear clamp member 306 allows the reactor lid 92 and the reactor 30 to separate slightly, while still being retained by top angled edge 316 and bottom angled edge 318, respectively. FIG. 21 illustrates an exploded, cut-away view of reactor lid 92 and reactor 30 separating, while still being retained by top angled edge 316 and bottom angled edge 318, respectively. The slight separation of the reactor lid 92 from the reactor 30 serves to vent excess pressure from the internal reaction chamber 96 to the surrounding atmosphere through the openings created by the separation of front clamp member 304 and rear clamp member 306, and return the reactor 30 to a safe operating pressure. When a safe operating pressure inside the reactor 30 is reached, the springs 312 expand, which forces the front clamp member 304 and the rear clamp member 306 together, which in turn causes top angled edge 316 and bottom angled edge 318 to exert increased pressure on reactor lid 92 and reactor 30, to seal the reactor lid 92 to the reactor 30. The reversibility of this pressure venting process allows reactor 30 and reactor lid 92 to be separated and rejoined multiple times during the course of a reaction without operator intervention, should reaction conditions require.

Computer Software

The computer 18 includes software that an automated laboratory workstation used to control the laboratory instruments and/or plan automated experiments using the modular reactor system 10. The computer 18 includes a microprocessor/controller running an operating system such as WINDOWS® 2000 that allows for graphical program manipulation. An input/output device is connected to the microprocessor and allows the user of the modular reactor system 10 to interact with the microprocessor. The input/output device typically includes a keyboard, monitor, mouse, speakers and/or other input/output devices used in association with computers such as microphones, touch screens, trackballs, etc. As shown in FIG. 5, the microprocessor is connected to the processor 54 of the backplane 12 through RS-232 interface 51. The processor 54 interacts with the microprocessor of the computer and the dedicated module control units 60 to deliver control signals to the laboratory devices associated with the modules 16. The laboratory devices 118 may include, for example, pumps, stirrers, heaters, coolers, vacuum devices, temperature monitors, pressure monitors, and other sensors and laboratory instruments. Furthermore, the terms "laboratory devices" or "laboratory instruments" as used herein may refer to any number of devices used in chemical processes, regardless of size, and regardless of whether the device is or can be used in a traditional "laboratory" setting.

Figure 11A:
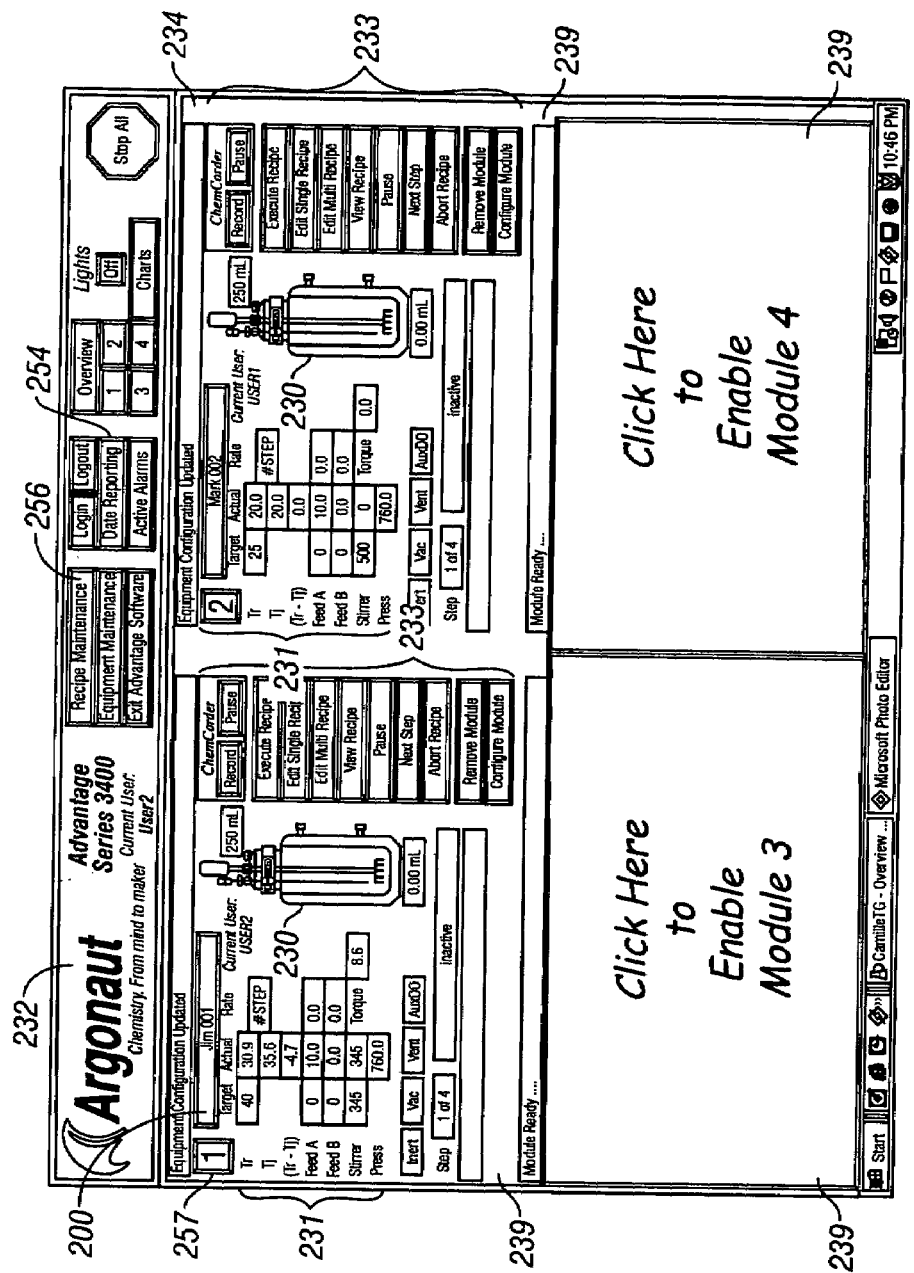
FIG. 11A shows an overview screen of a graphical user desktop of the modular reactor system.
Figure 11B:
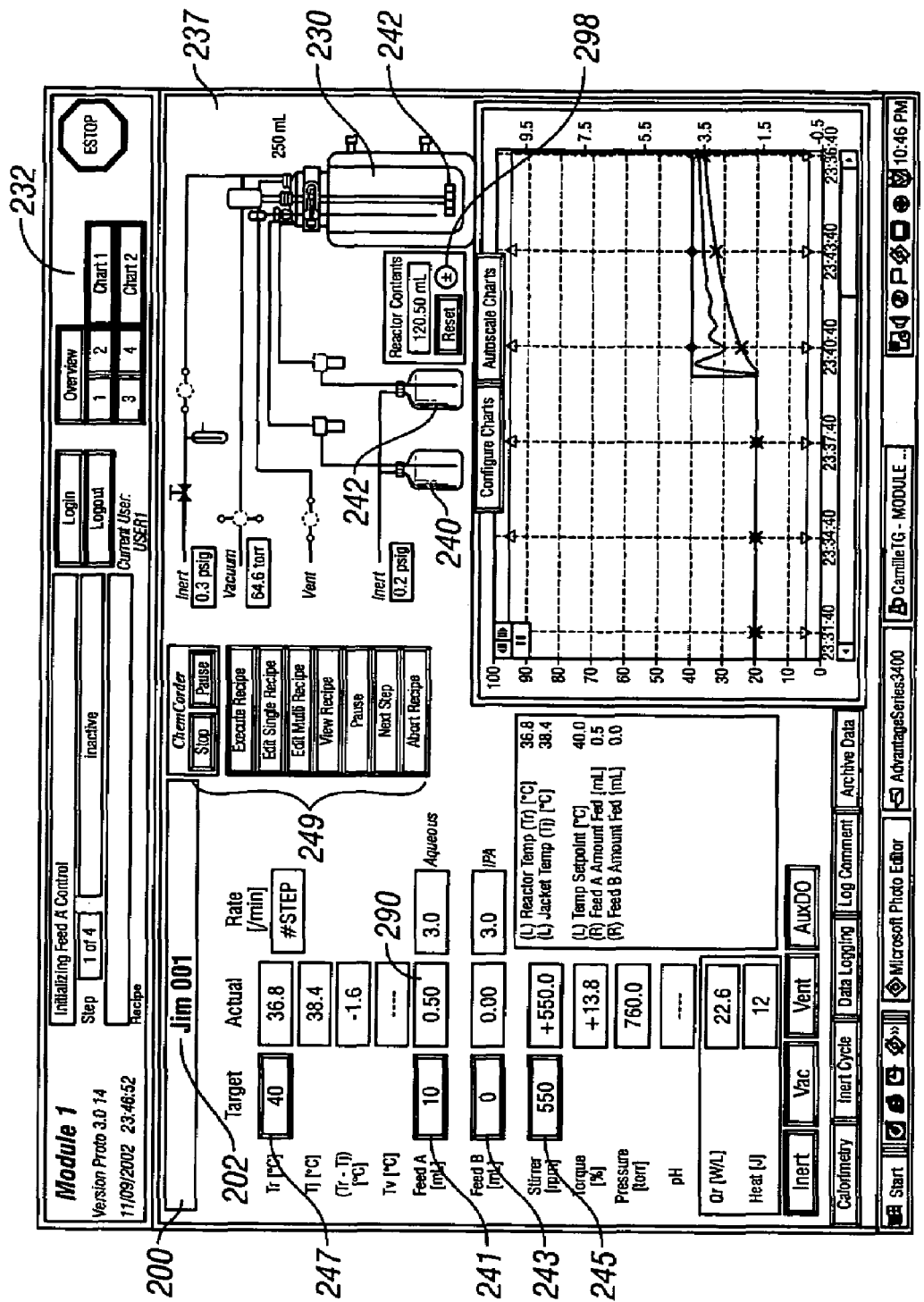
FIG. 11B shows a more detailed overview screen accessible from the overview screen of FIG. 11A.

With reference to FIGS. 11A and 11B, the software stored in the computer 18 provides a graphical user desktop 232 for controlling and/or programming the laboratory devices, including the laboratory devices located on any module positioned in any seat 20 of the backplane 12. The graphical user desktop 232 may be accessed by the user of the modular reactor system through the input/output device. As shown in FIG. 11A, the graphical user desktop 232 includes an overview screen 234 that displays graphical representations of each module reactor 230. In the embodiment shown, the overview screen 234 is divided into four quadrants 239, with each quadrant showing one module reactor 230. At the discretion of the user, the modules may be viewed or may remain hidden in each quadrant. When a module reactor is displayed in one of the quadrants 239, a representation of the reactor 230 is shown along with a table of data 231 specific to that module reactor. A menu 233 is also provided next to each reactor 230, thus providing the user with options concerning control of the module and the data shown in association with the module.

Figure 15:
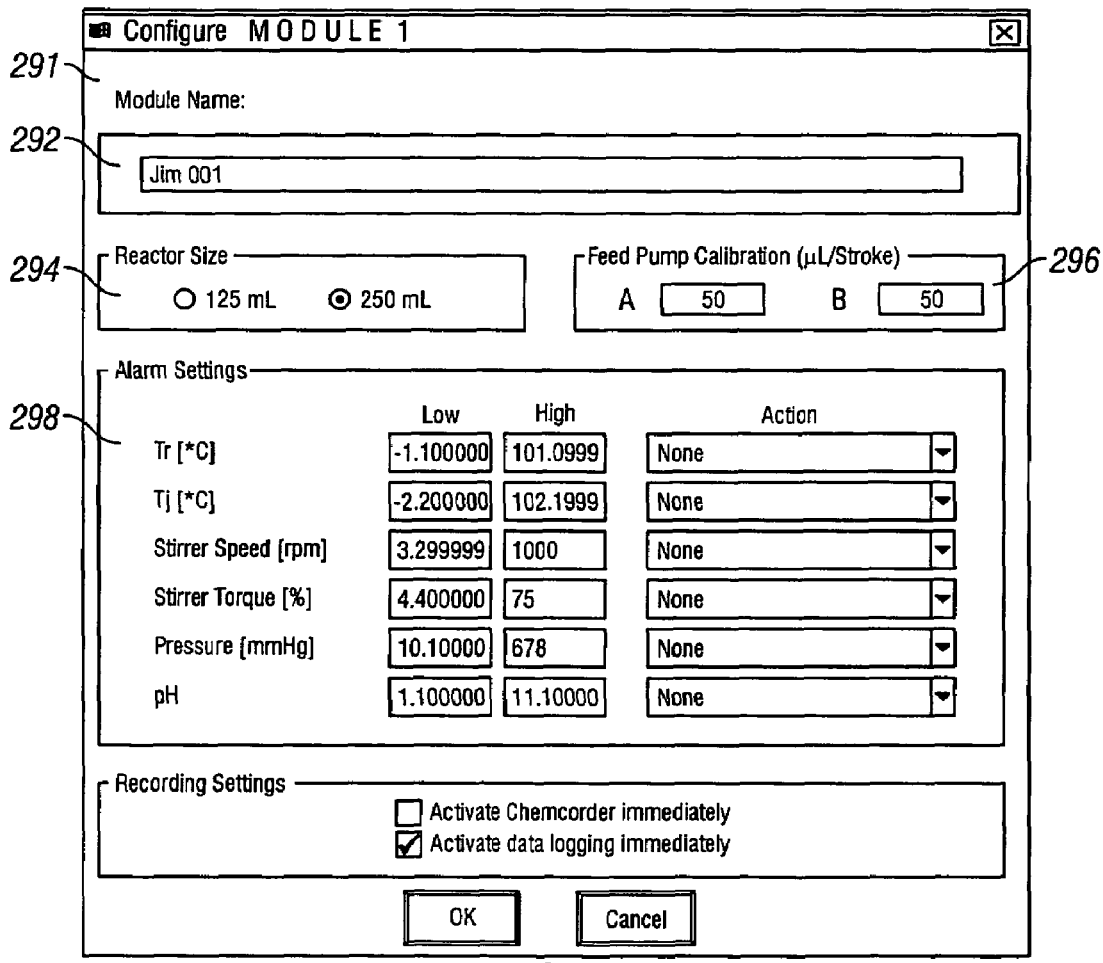
FIG. 15 shows a configuration screen associated with the graphical user desktop of FIG. 11A or 11B.

One of the menu 233 options allows the user to provide configuration parameters for the particular module to the computer. In particular, by selecting the "configure module" option from the menu 233, the user is provided with a configuration screen, such as that shown in FIG. 15. The configuration screen 291 provides a name block 292 for the user to input/edit the module name that will be associated with the configuration. In addition, the configuration screen allows the user to input the reactor size associated with the module in block 294, calibrate the feed pumps associated with the module in block 296, and input a number of alarm settings in block 298. After selecting the "OK" button on the configuration screen, the user is returned to the overview screen.

Referring again to FIG. 11A, the menu 233 also provides the user with the ability to remove the module from the screen by selecting the "Remove Module" option from the menu. As explained in more detail below, the menu 233 also provides the user with options related to a program or "recipe" Furthermore, the menu provides the user with the ability to record a series of steps that are taken with respect to a particular module and save those steps in a "recipe". This process of recording is described in further detail in pending U.S. application Ser. No. 10/162,272, which is incorporated herein by reference.

A larger, more detailed overview screen for each reactor 230 may be viewed by clicking on the quadrant number 257 or the module name 202 associated with the reactor 230 shown on the overview screen 234. One embodiment of the more detailed overview screen 237 is shown in FIG. 11B. As shown in FIG. 11B, the more detailed overview screen 237 is similar to the overview screen 234 shown in FIG. 11A, but includes additional information. The more detailed overview screen 237 includes a representation of the reactor 230 located on the module, a menu 249, and a table of data 248 for each reactor. The table of data 248 includes columns showing the target and actual amounts for various parameters related to the reactor, including temperature of the reactor, temperature of the jacket, feed volumes for the reagents, stirrer speed and torque, pressure within the reactor and pH within the reactor. A third column of feed rates is also provided for determining the rate at which reagents will be fed to the reactor. The overview screen 237 also includes a graph that provides a visual display of selected parameters shown in the table 248 during a chosen time period. The more detailed overview screen 237 also includes representations of the reagent feeds 240 and 242, a representation of the vacuum line 255 and representation of the inert gas/pressure line 253.

With continued reference to FIGS. 11A and 11B, the graphical user desktop 232 allows the user to easily control and monitor the progress of an experiment from the overview screen 234. The particular reactor being shown on the overview screen is identified by a reactor identification block 200. The reactor identification block 200 shows the name 202 of the module holding the reactor. Although the modules are formally identified by the modular reactor system based on the electronic tag on the module, the graphical user desktop allows the user to identify modules by more user-friendly names. As shown in FIG. 11B, the module holding the reactor represented by reference numeral 230 is named "Jim 001". If the user wishes to see the set-up for a reactor associated with a different module, the user simply goes to overview screen 234 and selects the module. The detailed view of that module may then be displayed on the full screen, as described above.

The graphical user desktop 232 also provides the user with the ability to control each of the laboratory devices used in the experiment directly from the screen. Accordingly, the modular reactor system 10 allows the user to conduct an experiment by commanding one instrument after another to take certain actions, thereby orchestrating the experiment step-by-step, in real-time, from the desktop 232. Alternatively, as explained in more detail below, the user may program the system to run independent of human operation, and thereby leave the desktop while the experiment is automatically carried out under computer control.

Real Time Experiment Control

Figure 12:
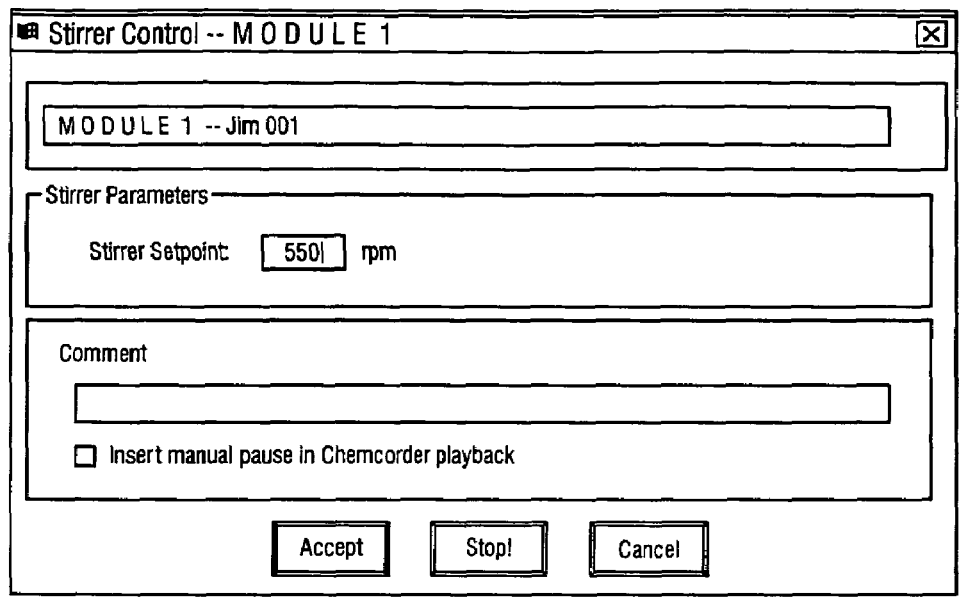
FIG. 12 shows a dialog box associated with the graphical user desktop of FIG. 11.

All laboratory devices depicted on the graphical user desktop 232 may be controlled by clicking on the control "button" (i.e., selectable option) associated with that device (e.g., the "Feed A Control" button 241, the "Feed B Control" button 243, the "Stirrer Control" button 245, or the "Temperature Control" button 247). A mouse or other input device is provided to allow the user to select the desired device/buttons for manipulation. For example, if the user selects the "Stiffer Control" button 245, a dialog box will be displayed showing the stirrer parameters, as shown in FIG. 12. Thus, if the user wants to change the stirrer speed from 550 rpm to 500 rpm, the user selects the display of the stirrer setpoint rpm in the dialog box and, using the keyboard, inserts the number "500" in place of the number "550." Next, the user selects the "Accept" button at the bottom of the dialog box, and the stirrer immediately starts spinning at the new rate of 500 rpm. Of course, any number of different means may be used to allow the user to enter operating parameters and the system to receive such parameters related to a particular laboratory device. For example, representative device control panels could be used to allow the user to enter the operational parameters or graphical parameter representations could be used to adjust parameters (e.g., clicking on a representative stirrer could adjust the stirrer spin speed). As a further example, operational parameters could be keyed into the system, adjusted by a click of the mouse, or entered vocally.

Similarly, the user may click on one of the "Feed Control" 241 or 243 buttons to control the feed rate and amount of liquid product to be fed to the reactor. After clicking on the "Feed Control" buttons, a dialog box appears, similar to that shown in FIG. 12, allowing the user to insert a desired feed rate (in weight or volume per minute) and a desired feed amount (in total weight or volume). Again, after clicking the "Accept" button at the bottom of the dialog box, the workstation will begin the desired feed.

The desktop also provides for temperature control of the reactor. After clicking on the "Temperature Control" button 247, a dialog box appears, allowing the user to choose the desired temperature measurement to control. After choosing a desired temperature or temperature range, the user also provides a ramp rate which defines the rate at which the temperature will change (e.g., ° C./min). After completing the information in the dialog box, the user clicks the "Accept" button at the bottom of the dialog box and the workstation immediately begins to control the identified temperature based upon the users instructions. When the temperature control determines that the temperature is not in the preferred range, heat transfer into or out of the reactor is controlled as described above with respect to the thermal control unit 14.

With reference to FIG. 11B, the information presented on the overview screen 237 continuously changes based upon actual experiment conditions. For example, the "Feed A" data box 290 is periodically updated to show the actual amount of fluid that has been fed through the Feed 1 pump. Likewise, other cells of the "Reactor Conditions" table 248 keep track of various temperatures, reactor pressure and reactor pH. Also, the "Reactor Contents" data box 298 keeps track of the total volume of fluid in the reactor, if applicable. If any experiment parameter reaches a certain threshold, a warning will be sounded or displayed on the desktop. For example, if the volume of reactor contents becomes dangerously high, an alarm sounds or a message appears on the screen warning the user to avoid over-filling the reactor. Similarly, if the reactor contents reach a threshold temperature, making the reactor unstable, a warning will be sounded or displayed, warning the user to decrease the temperature of the reactor contents.

Recipe Programming and Unattended Operation

Figure 13:
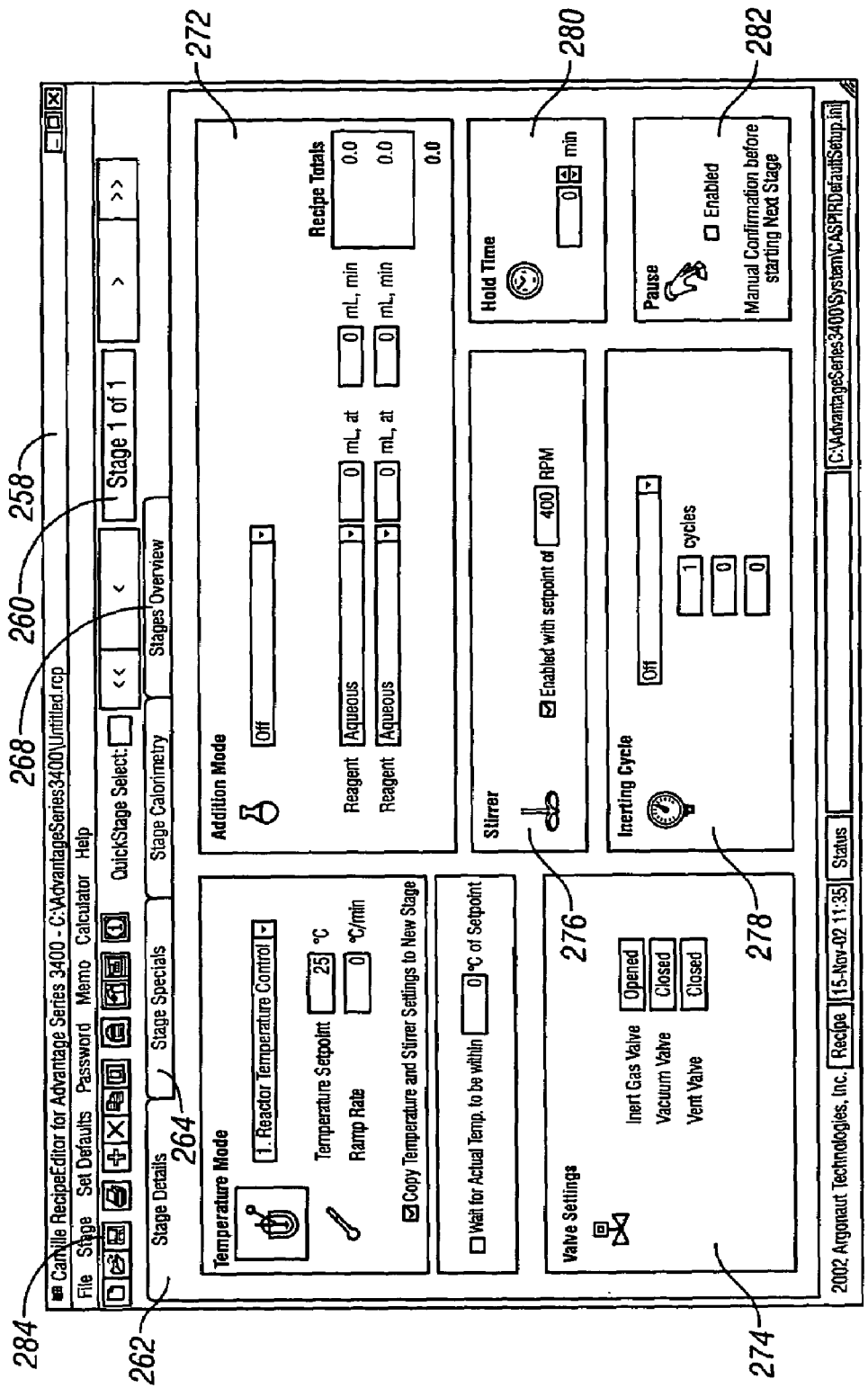
FIG. 13 shows a stage details screen of a recipe editor of the modular reactor system.

If the user desires, the system 10 may be pre-programmed to complete all steps of an experiment automatically with respect to a particular module, thereby allowing the experiment to be conducted unattended once the module is positioned in a slot 20 of the backplane 12. By clicking on the "Edit Single Recipe" button from the menu 233 or 249, or by selecting the "Recipe Maintenance" option 256 provided along the top of the overview screen, the user is presented with a "recipe editor" 258, such as that shown in FIG. 13. The recipe editor 258 is a tool for programming an experiment to be performed automatically by defining a "recipe" (i.e., a series of steps to be followed to accomplish a desired result). The recipe is saved as an executable computer program that can be played using the system software. The recipe editor includes a "Stage Details" tab 262, a "Stage Specials" tab 264, and a "Stage Overview" tab 268. Each tab provides different options to the user concerning the recipe.

Under the "Stage Details" tab 262, the recipe editor 258 is designed to set up the automated experiment to be conducted in the reactor of a particular module as a series of steps or stages. A stage indicator 260 is provided on each screen of the recipe editor on the top right of the screen. The stage indicator shows an indication of the stage as well as arrows for maneuvering between stages. The user programs each stage of the recipe under the "Stage Details" tab, and by using the stage indicator to maneuver between stages. Each screen under the "Stage Details" tab includes a variety of icons representative of various operations (e.g., temperature control 270, addition of liquids 272, valve settings 274, pressure control 278, stirring 276, etc.). The user identifies a desired action in each stage by inputting performance information in the boxes associated with each icon. For example, if the user wants to start the experiment by setting the reactor temperature to 25° C. for at least 20 minutes, the temperature set point of 25° C. is indicated in temperature mode box 270 and a hold time of 20 minutes is indicated in the hold time box 280. After identifying this first stage, the user then moves to the next stage by pressing the ">" arrow in the stage indicator 260. In the next stage, the user programs an additional step to be carried out, such as adding a new chemical through the "addition mode" box 272 or stirring the reaction through the "stirrer" box 276. When additional stages are added, the total number of stages in the experiment are shown in the stage indicator 260. For example, in FIG. 13, a seven stage experiment has been created and the first stage of the experiment is displayed in under the "Stage Details" tab. The user can move between stages by clicking the arrows to the right and left of the indicated stage in the stage indicator 260. By moving through the experiment stage-by-stage, the user defines the complete experiment, breaking down the experiment to define how the equipment and laboratory devices should function in each stage.

In addition to automated stages, the user may program a manual stage. This is done by clicking the "enabled" button in the manual confirmation box 282, and inserting instructions on the manual step to be taken by the user. This feature is especially useful when solid or liquid reagents are to be added to the reactor during an experiment. For example, if 10 ml of NaCl is to be added to the reactor in a given stage, the user can note this as a stage in the recipe editor and note that manual confirmation is required before moving to the next stage. Thus, when the workstation automatically replays the recipe, a confirmation box will appear asking if 10 ml of NaCl has been added to the reactor. The confirmation box will include "yes" and "no" buttons the user may click in response. The workstation will not proceed with the experiment until the user makes a positive response that the NaCl has been added. Of course, the recipe programmer must recognize that manual confirmation steps can not be used if he/she desires to conduct a fully automated experiment with no user present to oversee the experiment.

The "Stage Specials" tab 264 allows the user to customize certain functions associated with different stages of the programmed experiment. For example, the "Stage Specials" tab provides for experiment termination conditions (e.g., excessive pressure, temperature, etc.), data logging rates (i.e., snapshot of experiment conditions taken at a periodic rate), and special alarm settings (e.g., excessive pressure, temperature, etc.).

The "Stages Overview" tab 268 allows the user to review the entire experiment in a single spreadsheet format, such as that shown in FIG. 14. The "Stages Overview" tab 268 allows the user to see stages next to each other in tabular fashion, allowing the user to view the entire experiment on a single page, line-by-line. If the user sees any problems with the experiment set-up or desires changes in any particular stage, he or she can double click on the line showing the particular stage and be transferred to the "Stage Details" tab for that stage. At the "Stage Details" tab, the user may make any required modifications to the experimental set-up. Alternatively, the user may make modifications to different stages directly from the "Stages Overview" tab 268 by single clicking on an particular information item and changing the entry for that item. For example, if the user wants to change the hold time in step one from 20 to 25 minutes, the user can click on the "20" in line one and enter the new data in place of the old.

After all stages of a recipe are entered into the system, the recipe is saved by clicking the "Save" button 284. Thereafter, the created recipe is saved and the user is returned to the overview screen 234 or 237.

At the overview screen 234 or 237, the user may execute the recipe by clicking on the "Execute Recipe" button from the menu 233 or 249. Choosing this "Execute Recipe" button will allow the user to choose from a list of recipes saved in the system. After the user chooses a recipe, the software will confirm that all laboratory devices required to execute the chosen recipe are connected to the system. If all required laboratory devices are not connected, the user will receive an error message informing the user that the required devices to execute the recipe are not properly connected. Also, before starting the experiment, the system will request confirmation that the reactor 30 has been filled with any required starting materials. Finally, before starting the experiment, the system will ask the user when he or she wants the experiment to begin. The user generally has the ability to start the experiment immediately or at a predefined time. For example, if the user wants an experiment to start in the middle of the night, the user can instruct the workstation to start the experiment at that time.

The overview screen 234 or 237 also provides the user with the ability to edit any recipes saved in the system. This option is available by clicking the "Edit Single Recipe" button provided on the menu 233 or 249. By clicking the "Edit Single Recipe" button, the user is presented with a list of recipes saved in the system. After the user chooses a recipe, the recipe information is presented in the recipe editor and the recipe may be edited in the recipe editor, as described above.

Operation of the Modular Reactor System

As discussed above, when a chemist wants to conduct an experiment in one of the reactors, the experiment may be conducted in real-time or programmed into the computer for future automatic execution using the modular reactor system. It is anticipated that experiments using the modular reactor system will typically be pre-programmed for later execution. In particular, the modular reactor system allows a plurality of chemists to each have control over a plurality of modules. Using the computer 18, each chemist may then program experiments to be conducted in each of the modules. As discussed above, because the modular reactor system is capable of taking different actions with respect to different modules in different slots of the backplane, the experiments programmed for different modules may vary significantly in terms of functions used in each experiment and steps conducted to complete each experiment. For example, one experiment may call for continuous stirring while another experiment conducted in an adjacent module may call for no stirring. As another example, controlling the temperature in one module reactor may require cooling fluid to flow into the cooling chamber at 5° C., while cooling fluid for another module reactor in an adjacent slot may only require cooling fluid at 50° C.

After the module is set up to conduct the experiment as programmed, the module is given to a laboratory technician for execution of the experiments using the modular reactor system. The laboratory technician places modules 16 in the backplane 12 as the slots 20 become available. When a particular module 16 is placed in the backplane, the identification reader 22 reads the identification of the module 16 and forwards the identification to the processor 54 and computer 18. The computer automatically recognizes the module and temporarily associates the module with the particular slot in which it was placed. The computer also accesses the program associated with that module and determines if the module contains all laboratory instruments required to conduct the experiment as programmed. Thereafter, when executing the instructions contained in the program associated with that module, the computer uses the laboratory instruments associated with the slot retaining the module to execute the instructions and thereby conduct an experiment in the module reactor. In this manner, experiments may be programmed for individual modules without limiting the module to any particular slot of the backplane.

A chemist wishing to use the modular reactor system first visits the computer 18 and, using the recipe editor, enters step-by-step instructions for completion of an experiment to be conducted in a particular module. Part of the programming process involves association of the planned experiment with one of the reactor modules. This may be accomplished because each reactor module has a unique ID in the form of a number, bar code or other identifier, allowing the chemist to identify the reactor module to the computer. Of course, as discussed above, user-friendly names may be assigned to each module to help the chemist easily remember the names of the modules. After programming a set of instructions for completing an experiment in a particular module, the chemist prepares the module and associated reactor for the automated experiment by inserting initial reaction contents into the reactor vessel, providing reagents to be added during the experiment in a reagent bottle, attaching laboratory instruments to the reactor (e.g., temperature sensors), attaching required tubes and lines on the module, and/or taking any other required preparatory steps. After the reactor module is readied for the experiment, the chemist indicates that the module is ready for an experiment in the backplane. This can be accomplished by any of various protocols, such as placing the module in a queue or otherwise passing the module on to a laboratory technician responsible for keeping experiments running in the backplane. When a slot becomes available in the backplane, the laboratory technician seats the module in the open slot, making sure that all standard connections are made between the module and the backplane, including connection of the electrical connectors, gas line connectors and fluid ports. The laboratory technician also makes any additional required connections between the backplane and the module, such as connection of sensors to receptacles 44 and connection of the stirrer shaft to the drive shaft of the motor.

When the backplane receives a reactor module, the identification on the module allows the module to be associated with a pre-recorded recipe, if applicable. Thus, if the identification is a human readable identification, the laboratory technician will indicate that the particular module is seated in a particular slot. This allows the computer to retrieve instructions for that module and direct actions for that module to the slot where the module is located. On the other hand, if the identification is an electronic tag or other machine-readable identification, the tag reader reads the tag on the module and reports the identification of the module to the computer. Based on the identification and the tag reader relaying the identification, the computer automatically recognizes the particular reactor module and the particular slot of the backplane where the module is seated. The computer then retrieves the instructions related to that particular module and proceeds to conduct the experiment designed for the materials in the designated module, using the laboratory instruments on the module and associated with the slot in which the module was placed. Accordingly, the lab technician is not restricted to placing the module in any particular slot of the backplane, as the computer has the ability to recognize the module and execute specific instructions for the module, regardless of the slot in which the module is placed.

Based on the information provided to the computer, the software residing on the computer 18 delivers control signals to the backplane, reactor modules seated in slots of the backplane, and the thermal control unit. These control signals allow experiments to be automatically conducted in each reactor. For example, a control signal from the computer will instruct a motor in the backplane to stir the contents of one of the reactors at a particular time, or instruct the thermal control unit to deliver liquid cooling agent to the reactor at a given time. Of course, the backplane is designed to accommodate a number of reactor modules, so numerous experiments may be conducted simultaneously using the present invention. Furthermore, because of the modular nature of the system, the modular reactor system can simultaneously conduct a number of distinct experiments. These distinct experiments may vary in any number of different ways, including distinct functions and processes, since the laboratory instruments and tools available to each slot and the module placed in that slot may be controlled completely independent of the laboratory instruments and tools available to adjacent slots and modules placed in those slots. The computer is also capable of avoiding scheduling conflicts between various devices (e.g., conflicts with use of the robotic arm). However, scheduling conflicts will not typically be a problem, as each slot of the backplane typically has identical laboratory instruments, and there are few, if any, laboratory instruments that must be shared between slots. The fact that each slot includes a standardized set of laboratory instruments, allows any given experiment to be conducted in any given slot. Because the modular reactor system allows the chemist to pre-program experiments in individual modules for later execution, and because the experiments may be conducted automatically without the presence of the chemist, the chemist is freed to work on other tasks. For example, the chemist may spend his or her time planning future experiments while other experiments are conducted automatically. Alternatively, the chemist may queue up a number of modules to for experiments during the night hours, when the chemist is away from the laboratory.

Although the present invention has been described in considerable detail with reference to certain preferred versions thereof, other versions are possible. For example, the physical form of the backplane and modules may take on number of different embodiments other than those described. In particular, the connectors and receptacles of the backplane could all be positioned differently, or the top canopy could be removed from the backplane. In addition, certain laboratory instruments could be added or removed from the backplane or any of the modules. The modules could take on different shapes or sizes, and different mechanisms could be used to seat the modules in the backplane. Furthermore, the graphical user desktop used to conduct experiments could be set up differently than that shown and described. Therefore, the spirit and scope of the appended claims should not be limited to the description of the preferred versions contained herein.

What is claimed is:

1. A clamp for securing a reactor lid to a reactor vessel, the clamp comprising:
    a. a first clamp member;
    b. a second clamp member releasably joined to the first clamp member, the second clamp member including a channel;
    c. a bolt extending between the first clamp member and the second clamp member;
    d. a spring retained upon the bolt such that compression of the spring biases the first clamp member toward the second clamp member, wherein movement of the first clamp member away from the second clamp member further compresses the spring; and
    e. a nut engaging the bolt, the nut retained within the channel, contacting one end of the spring and compressing the spring when the nut is moved in the channel.

2. The clamp of claim 1 wherein the first clamp member includes a first surface contacting the reactor vessel.

3. The clamp of claim 1 wherein the second clamp member includes a second surface contacting the reactor lid.

4. A device for securing a reactor lid to a reactor vessel comprising:
    a. a first clamp member associated with and positioned a first distance from a second clamp member, the first clamp member and the second clamp member both having an angled edge;
    b. at least one spring retained by the second clamp member, wherein the at least one spring is compressed to hold the first clamp member to the second clamp member, the at least one spring arranged and positioned upon the second clamp member such that application of a force greater than a threshold force by a reactor lid to the angled edge of the first clamp member and the second clamp member will result in further compression of the at least one spring while the first clamp member separates from the second clamp member, and reduction of the force below the threshold force will result in decompression of the spring while the first clamp member and second clamp member return to the first distance; and
    c. a module shell for retaining the reactor vessel, the device being releasably mounted to the module shell.

5. A device as in claim 4 where the threshold force is adjustable using an adjusting means operable to further compress or decompress the spring.

6. A device as in claim 5 where the adjusting means comprises one or more threaded bolts which extend through the first clamp member and engage the at least one spring retained in the second clamp member to compress or relax the at least one spring.

* * * * *